United States Patent [19]
Yamabata et al.

[11] Patent Number: 5,212,676
[45] Date of Patent: May 18, 1993

[54] PERFORMANCE INFORMATION RECORDING/REPRODUCING APPARATUS HAVING CORRECTION TECHNIQUES USING EVENT AND STATE INFORMATION

[75] Inventors: Toshio Yamabata; Satoshi Otsuka; Mitsuhiro Umeta; Fumio Rokkaku; Takenori Yamamori; Minoru Fujisawa; Koji Hara, all of Hamamatsu, Japan

[73] Assignee: Roland Corporation, Osaka, Japan

[21] Appl. No.: 650,872

[22] Filed: Feb. 5, 1991

[30] Foreign Application Priority Data

Feb. 7, 1990 [JP] Japan ................................. 2-27930
Oct. 4, 1990 [JP] Japan ................................. 2-268111

[51] Int. Cl.⁵ ............................................. G11B 7/00
[52] U.S. Cl. ......................................... 369/48; 369/58; 84/645
[58] Field of Search .............. 369/47, 48, 54, 58, 369/32, 124; 360/48, 32; 84/615, 645, 653, 615, 617

[56] References Cited

U.S. PATENT DOCUMENTS

| | | | |
|---|---|---|---|
| 4,942,551 | 7/1990 | Klappert et al. | 369/47 |
| 5,025,701 | 6/1991 | Matsumoto | 84/645 |
| 5,054,359 | 10/1991 | Hikawa | 84/645 |

Primary Examiner—Aristotelis Psitos
Assistant Examiner—Muhammad Edun

[57] ABSTRACT

A performance information recording/playing apparatus corrects recording/playing errors in performance information which is reproduced from or recorded to a recording media by a performance information playing/(recording) device in accordance with event information. The performance information recording device includes a state information generating device which generates state information indicating a state of musical tone for a predetermined musical tone after a change has occurred in event information which represents a change in the predetermined musical tone, and a recording device for recording the event information and the state information in a recording media sequentially. The performance information playing device includes a playing device for playing event information which represents a change in a predetermined musical tone and state information which indicates a state of a musical tone for the predetermined musical tone, this information having recorded in a recording media. Further, the performance information playing device includes an event information correcting device for correcting errors in the event information, which is reproduced from the recording media, based on the state information which is reproduced in the same manner.

12 Claims, 22 Drawing Sheets

| MIDI channel No. | Note No. | Note-on flag | Velocity |
|---|---|---|---|
| 0 | 0 | | |
| 0 | 1 | | |
| 0 | 2 | | |
| ⋮ | ⋮ | ⋮ | ⋮ |
| 0 | 126 | | |
| 0 | 127 | | |
| 1 | 0 | | |
| 1 | 1 | | |
| ⋮ | ⋮ | ⋮ | ⋮ |
| 1 | 127 | | |
| 2 | 0 | | |
| ⋮ | ⋮ | ⋮ | ⋮ |
| 15 | 126 | | |
| 15 | 127 | | |

FIG.3

| Name of byte | Type of byte |
|---|---|
| F0H | Exclusive status |
| MAN | Manufacture ID |
| DEV | Device ID |
| MDL | Model ID |
| CMD | Command ID |
| [BODY] ⋮ | Data body (State data) ⋮ |
| F7H | End of system exclusive |

FIG.12

PERFORMANCE INFORMATION RECORDING/REPRODUCING APPARATUS HAVING CORRECTION TECHNIQUES USING EVENT AND STATE INFORMATION

BACKGROUND OF THE INVENTION

1) Field of the Invention

The present invention relates to a performance information recording/playing apparatus, and more particularly, to a technique of correcting the recording/playing errors of performance information, that is, event information, which is recorded in a recording media by the performance information recording/(playing) apparatus and played from the recording media by the performance information (recording)/playing apparatus.

2) Description of Related Art

The exchange of performance information through a recording media, for example, such as a video or audio tape etc., can be performed based on a MIDI standard. The exchange of the performance information by the MIDI standard includes the exchange of event information which causes a change in a predetermined musical tone concerning the operation of a key or switch, etc. Note-on information and note-off information concerning key-on/off information, which are a kind of event information, are recorded/played only at the time of each key-on or key-off.

Further, a channel mode message is also recorded/played only at the time of an occurrence of the event information.

SUMMARY OF THE INVENTION

However, in the afore-mentioned art, due to the recording/playing errors of performance information, various problems occurs. For example, the missing of event information concerning a key-on/off information occurs, and as a result, a musical tone corresponding to a key-on is not obtained or generation of a musical tone continues even after a key-off.

Accordingly, in view of the aforementioned problems, in correcting recording/playing errors of a performance information, it is an object of the present invention to provide a performance information recording/playing apparatus which is capable of correcting the recording/playing errors effectively.

In order to accomplish this object, the performance information recording device in accordance with the present invention has characteristics in the constitution as shown in FIG. 1 and which comprises:

(a) state information generating means (1) for generating state information which indicates a control state of a musical tone on a predetermined musical tone after a change has occurred by event information which causes the change in the predetermined musical tone; and (b) recording means (2) for recording the event information and state information which is generated by the state information generating means (1) in a recording media sequentially.

The afore-mentioned state information generating means (1) may perform the generation of the state information of the predetermined musical tone by renewing the state information for the predetermined musical tone in a memory map in accordance with event information.

Further, the performance information playing device has characteristics in the constitution as shown in FIG. 1 and comprises:

(a) playing means (11) for playing an event information which causes a change in a predetermined musical tone and state information which indicates a control state of a musical tone of the predetermined musical tone after a change occurred by the event information which has been recorded in a recording media sequentially; and (b) event information correction means (12) for correcting errors in the event information, which is played from the recording media by the playing means (11) based on the state information which is played in a same manner.

The afore-mentioned event information correction means (12) can make correction by generating event information for amendment through the difference given by comparing the content after the renewal by the event information for the predetermined musical tone in a memory map and the state information.

Since the event information, which is performance information, is corrected by the state information which is also performance information, correction of the recording/playing errors of the performance information can be done effectively.

When the event information includes note-on information and note-off information and thereby the state information includes the present number of the note-on information which remains after subtracting the number of the note-off information for the predetermined musical tone. The afore-mentioned state information generation means (1) may perform the generation of the state information which includes the present number of the note-on information of the predetermined musical tone by renewing the state information which includes the present number of the note-on information of the predetermined musical tone in a memory map in accordance with event information. Further, the afore-mentioned event information correction means (12) can make correction by generating event information for amendment through the differences given by comparing the content which includes the present number of the note-on information which is renewed by event information for the predetermined musical tone in a memory map, and the state information which includes the present number of the note-on information.

Further, as to the timing of a performance, the performance information recording device comprises:

(a) event information number generating means which generates an event information number indicating the number of event information up to the present which is given by counting sequentially the event information which causes a change in a predetermined musical tone; and (b) recording means for recording the event information and the event information number which is generated by the event information number generating means in a recording media sequentially.

Also, a performance information playing device comprises:

(a) playing means for playing event information which causes a change in a predetermined musical tone and the number of the event information indicating the number of the event information up to the present which is given by counting the event information which has been recorded in a recording media sequentially; and (b) event information correcting means for correcting the errors of the event information which is played from the recording media by the playing means based on the event information number to be played in a same manner.

Further, the performance information recording/playing apparatus may comprise a performance information recording device and a performance information playing device.

Other objects of the present insertion will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWING

The present invention will become more fully understood from the detailed description given hereinbelow and the accompanying drawings which are given by way of illustration only, and thus are not limitative of the present invention, and wherein:

FIG. 2 to FIG. 20 are drawings for explaining a first embodiment of a performance information recording/playing apparatus in accordance with the present invention, FIG. 2 is a schematic block diagram;

FIG. 3 is a structural diagram of a note map to be stored in a RAM on the performance information recording device and the performance information playing device, respectively;

FIG. 4 to FIG. 11 are flow-charts of a main routine, a MIDI IN process routine, a state information process routine, a MIDI In interrupt process routine, a transmit interrupt process routine, a status byte process routine, a note-on/off process routine and a channel mode process routine on the performance information recording device, respectively;

FIG. 12 is a format diagram of state information;

FIGS. 13, 14, 15A, 15B and 17-20 are flow-charts of a main routine, a status byte decoding process routine, a state information decoding process routine, a note-on/off decoding process routine, a channel mode decoding process routine, a MIDI OUT interrupt process routine, a state renewal process routine and a note on/-off amendment process routine or the performance information playing device, respectively;

DETAILED DESCRIPTION OF PREFERRED EMBODIMENTS

Figure 1:
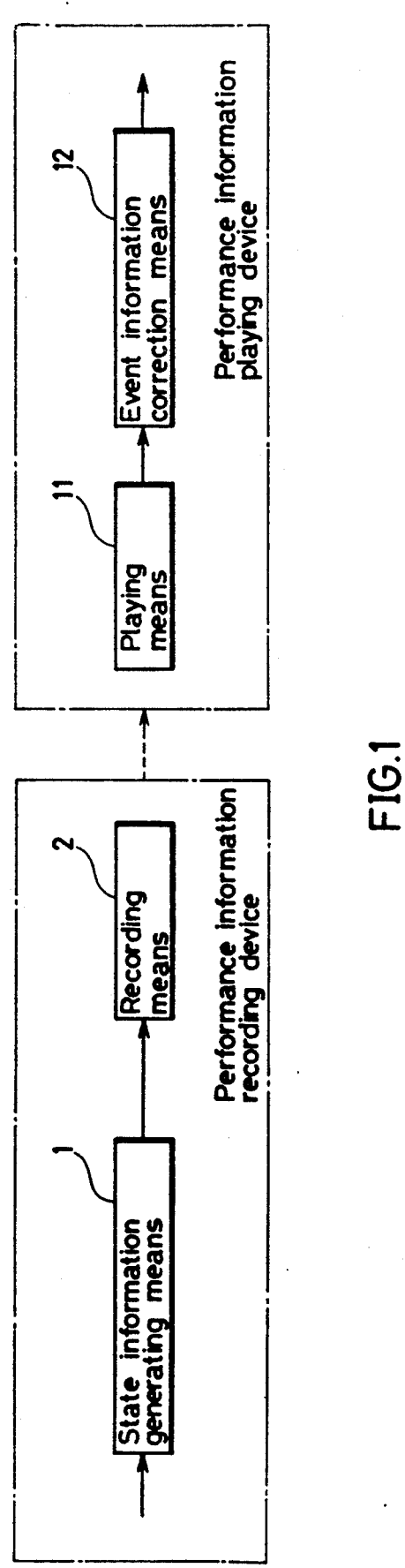
FIG. 1 is a block diagram corresponding to a constitution of the present invention.
Figure 2:
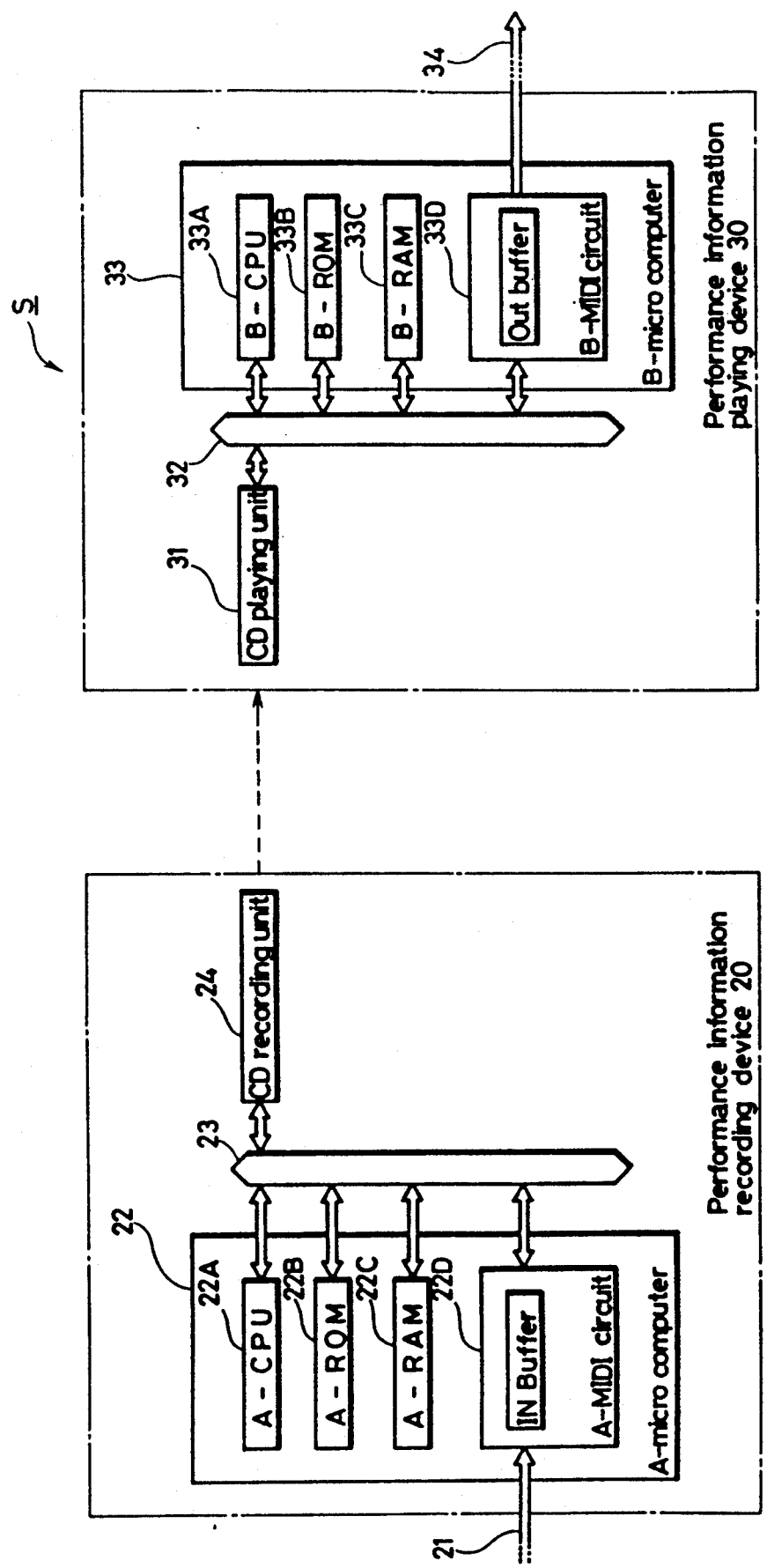

Next, the preferred embodiments of a performance information recording/playing apparatus in accordance with the present invention will be described referring to the drawings. First Embodiment:

First, the performance information recording/playing apparatus to which the invention may be applied is schematically shown in FIG. 2. As shown in it, the performance information recording/playing apparatus S comprises a performance information recording device 20 and a performance information playing device 30, and in the sub code area of CD which is one type of the recording media to be set in the performance information recording device 20, MIDI messages which are defined by the MIDI standard and state information which is inserted in the empty, time of the MIDI messages, are recorded. By setting the CD in which these MIDI messages and the state information have been recorded in the performance information playing device 30, the MIDI messages and state information are played. Included in the MIDI messages are event information which causes a change of a predetermined musical tone such as key-on or key-off information. The state information indicates a control state of a musical tone of the predetermined musical tone after the change caused by the key-on/-off information, which are made in the performance information recording device 20 based on the key-on/-off information included in the MIDI messages. In other words, they indicate the musical tone control state represented by a note-on flag and a velocity.

In the performance information recording device 20, the MIDI message including the key-on/-off information from a keyboard device and a sequencer (not shown in the drawings) or the like are inputted to an A-micro computer 22 through a MIDI bus 21, This A-micro computer 22 comprises an A-central processing unit (CPU) 22A which executes predetermined programs, an A-read only memory (ROM) 22B which stores the programs, an A-random access memory (RAM) 22C used as a working area or the like defining various registers, FIFOs, maps or the like required for executing the programs and a A-MIDI circuit 22D having a IN buffer of first-in and first-out style. The afore-mentioned MIDI messages which include key-on/-off information are inputted to and accumulated in the IN buffer of the A-MIDI circuit 22D. By executing the predetermined programs stored in the A-ROM 22B in advance, based on the MIDI messages accumulated in the IN buffer, the A-micro computer 22 inserts the contents of a A-note map, which is defined in the A-RAM 22C, stored and updated by the key-on/-off information included in the MIDI messages at the empty time of MIDI messages as the state information, transfers the state information together with the MIDI messages to the CD recording device 24 equipped with a recording buffer of first-in and first-out style via the A-MIDI bus 23 and gives a demand to record them to the CD recording unit 24. As shown on FIG. 3, this A-note map consists of 1) MIDI channel Nos. from 0 to 15, 2) note Nos. from 0 to 127 of each MIDI channel No., as addresses, and 3) note-on flags showing the key-on/-off states, 4) the velocities showing the touch of key in time of key-on in the key-on state and in time of key-off in the key-off state which are stored and updated by the key-on/-off information, corresponding to the MIDI channel Nos. and note Nos. And the content of the MIDI channel Nos., note Nos., note-on flags and velocities, are transferred to the CD recording unit 24 as the state information.

After the CD recording unit 24 has accumulated the MIDI message and the state information in the recording buffer, when there is a demand to record from the A-micro computer 22 and a new recording is possible as the previous one is finished, the CD recording unit 24 requests a transmit interruption to the A-micro computer 22 through the bus 23 and reads the MIDI messages and the state information which have been accumulated in the recording buffer. The recording data which are read out are recorded in the sub code area of CD after changing it to a predetermined signal form in accordance with the predetermined rule concerning the recording of the CD. When there is still a demand for recording from the A-micro computer 22 even after the recording of the read-out recording data, repeat the afore-mentioned reading out and recording.

In the performance information playing device 30, a CD playing unit 31 accumulates the MIDI messages and state information which are played from the sub code area of CD in accordance with a predetermined rule on the playing of the CD and are changed to the original signal form in the playing buffer as a playing data. When the playing data include an error, the CD playing unit 31 does not accumulate one pack of the playing data including the error and requests an wrong playing interruption to a B-micro computer 33.

The B-micro computer 33 comprises, same as the A-micro computer 22, a B-central Processing Unit (CPU) 33A which executes predetermined programs, a B-read only Memory (ROM) 33B which stores the programs, a B-random access memory (RAM) 33C used ar a working area or the like defining various registers FIFOs, maps or the like required for executing the programs and a B-MIDI circuit 33D having the OUT buffer of first-in and first-out type which made output the data to a MIDI bus 34 as MIDI messages or the like. By executing the predetermined programs stored in the B-ROM 33B in advance, based on the MIDI messages an state information which are playing data accumulated in the playing buffer of a CD playing unit 31, the B-micro computer 33 outputs from the OUT buffer of the B-MIDI circuit 33D to the MIDI bus 34 the MIDI messages and the MIDI messages for amendment which is amended by the state information in the B-note map which is defined in the B-RAM 33C to be stored and updated by the key-on/-off information included in the MIDI messages and amended by the state information. This B-note map consists of MIDI channel Nos. and note Nos. as address, and note-on flags and velocities which are stored and updated by the key-on/-off information, as shown in FIG. 3 same as the A-note map. Musical tone is generated from the music generating device or the like (not shown on the drawings), which is connected to the MIDI bus 34, based on the MIDI massages and the MIDI messages for amendment to be outputted to the MIDI bus 34.

Next, before referring to the function of the aforementioned performance information recording device 20, description is given about a IN FIFO, a Transfer-FIFO, a Real Time Transfer FIFO and IN Auxiliary FIFO in the working area which are defined in the A-RAM 22C.

IN FIFO

A first-in/first-out memory (FIFO) to be used for storing the MIDI message except for the system real time message read out from the IN buffer of the A-MIDI circuit 22D.

Transfer FIFO

A first-in/first-out memory (FIFO) to be used for transferring the MIDI messages except for the system real time message.

Real Time Transfer FIFO

A first-in/ first-out Memory (FIFO) to be used for transferring the system real time message.

IN Auxiliary FIFO

A first-in/first out Memory (FIFO) to be used for storing temporarily the MIDI messages except for the system real time message to be entered in the In FIFO.

These In FIFO, Transfer FIFO, Real Time Transfer FIFO and IN auxiliary FIFO which are supposedly constructed in a ring form perform the writing in and reading out at the addresses indicated by a writing pointer and a reading pointer respectively and at every writings in and reading out, each pointer is advanced.

No special description is given on various registers which store each variable, table, buffer, flag, pointer or the like, but they are presumed to be assigned at a predetermined area in the A-RAM 22C.

Figure 4:
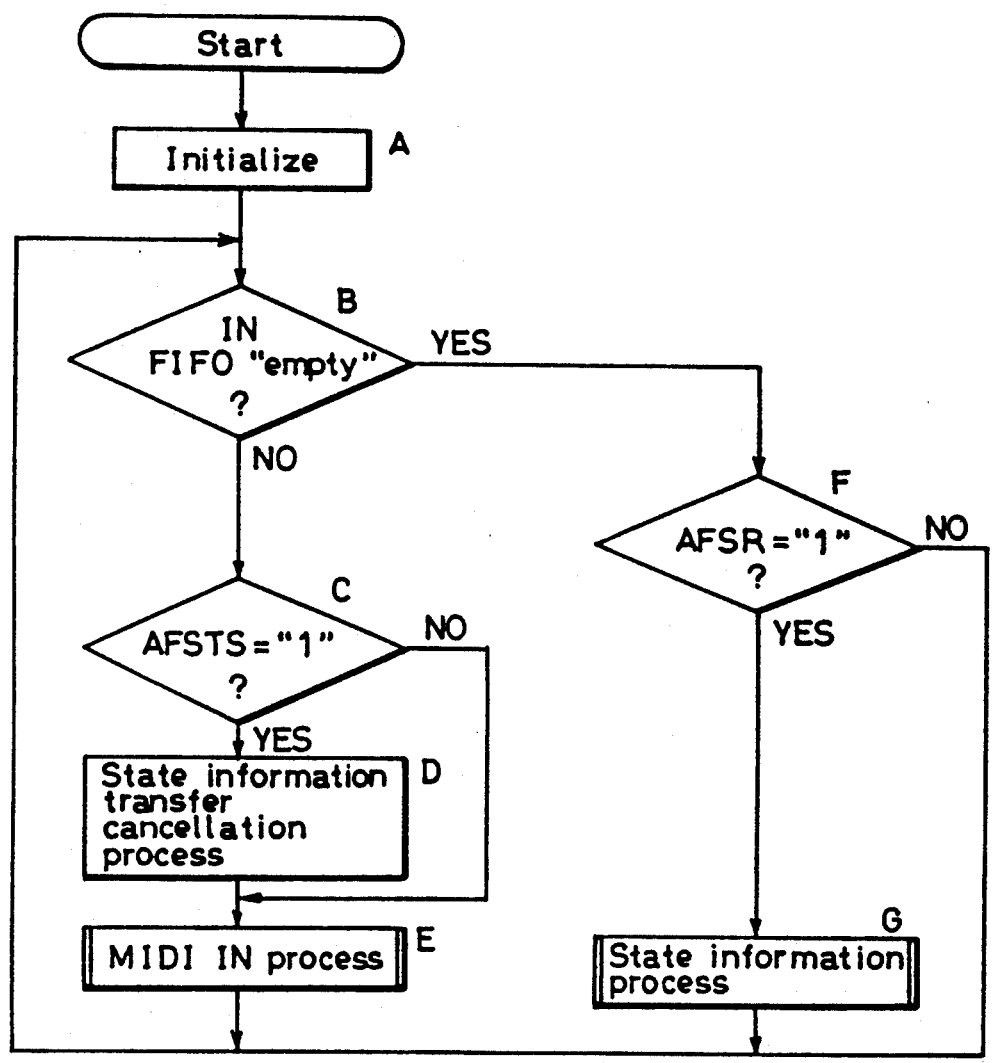

Next, the basic function of the performance information recording device 20 is described as follows according to the flow chart of a main routine on the recording side as shown in FIG. 4.

A. Power supply is turned on in order to start up execution of the predetermined programs and the contents of the A-RAM 22C are initialized by which the contents of various registers and all FIFOs, defined in the A-RAM 22C are cleared and concerning all the note Nos. of all the MIDI channels in the A-note map, the note-on flags are set as "1" and the velocities are set as "0". Further the IN buffer of the A-MIDI circuit 22D and the recording buffer of the CD recording unit 24 are cleared and initialized. The state of "1" of the note-on flag and "0" of the velocity is equal to the state of "0" of the note-on flag and "64" of the velocity, indicating the note-off.

B. A decision is made as to whether the In FIFO is "empty" or not. In case of "empty," go to step F.

C. On the decision in step B, in case that the In FIFO is not "empty", a decision is made as to whether a state information transfer processing flag AFSTS is "1" indicating a state information transfer process is under way, or not. In case of not "1", since it indicates that the state information transfer process is not under way, go to step E.

D. On the decision in Step C, in case that the state information transfer processing flag AFSTS is "1" indicating the state information transfer being under way, enter the "F7H", indicating the end of the transfer in the Transfer FIFO, and cancel the transfer of state information before the processing of a new MIDI message by sending a demand to record to the CD recording unit 24. Also, the state information transfer processing flag AFSTS is set as "0" indicating the transfer process is over. The reason for the above process is that even if the other MIDI message except for the system real time message are transferred and recorded while the state information is being transferred, it can not be decoded on &he playing side. Therefore, the transfer is canceled in order to enable the transfer of a new MIDI message.

Further, a state note No. ASRK indicating the note No,. which is an object of state information process is replaced with a reopened state note No. ASBK which indicates the note No. which is an object of the state information process in time of the reopening of transfer, so that the next one in the note No. can be transferred when the transfer is reopened E. A MIDI IN process routine. Execute the transfer process of the MIDI message entered in the IN FIFO, and update the A-note map. Details will be described later according to the flow chart shown in FIG. 5. After the MIDI IN process, return to step B.

F. On the decision in step B, in case that the IN FIFO is "empty", a decision is made as to whether a Transfer FIFO empty flag AFSR is "1" indicating both of the Transfer FIFO and the Real Time Transfer FIFO are empty or not. When the state information is remaining in the Transfer FIFO, the transfer of a new MIDI message in step E is delayed. This is why the state information is entered in the Transfer FIFO only when both of the Transfer FIFO and the Real Time Transfer FIFO are "empty." In case of not "1" indicating both of the Transfer FIFO and the Real Time Transfer FIFO are not "empty", return to step B, and go to step G in case of "1".

G. A state information process routine. The state information is transmitted by checking the A-note map. Details will be described later according to the flow chart shown in FIG. 6. After the state information process, return to step B.

In brief, based on the MIDI message inputted from the MIDI bus 21, the storing and update processes of the A-note map and the transferring processes of the MIDI messages to the CD recording unit 24 are executed. And the state of the A-note map is transmitted to the CD recording unit 24 sequentially as the state information.

Figure 7:
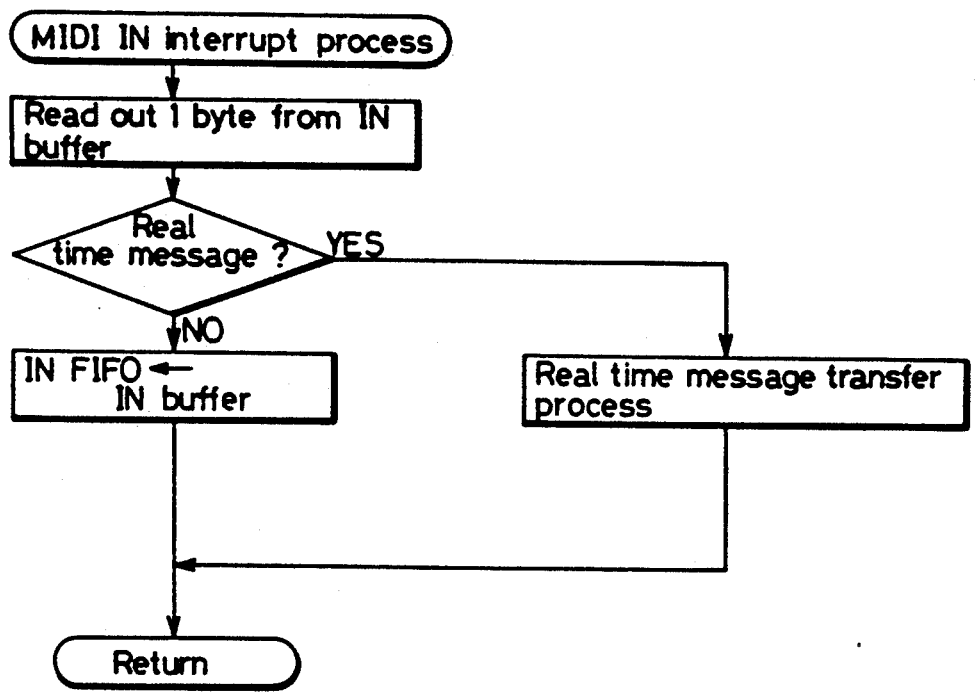

Before referring to the each sub routine of MIDI IN process routine (Step E) and state information process routine (Step G), a description is given on each interrupt process routine of MIDI IN interrupt process routine and transmit interrupt routine. MIDI IN interrupt process routine (FIG. 7)

A MIDI IN interruption is requested when the 1 byte of a MIDI message is accumulated in the IN buffer of the A-MIDI circuit 22D through the MIDI bus 21 and the following process is executed.

In case that the MIDI message which is accumulated in the IN buffer and read out from it is not a system real time message, the read-out MIDI message is entered in the IN FIFO. That is, the MIDI message which is not a system real time message inputted through the MIDI bus 21 is entered temporarily in the IN Auxiliary FIFO. In this way, a decision is made as to whether all the bytes consisting the MIDI message concerned were inputted or not. In case of all the bytes having been inputted each byte is passed through the IN auxiliary FIFO in sequence and entered in the IN FIFO and thereby the routine is finished. On the other hand, in case that not all of the bytes are inputted, the routine is over without executing no special processing. Further, if a status byte except for the new system real time message is inputted or the predetermined number of bytes corresponding to the, message type of the MIDI message concerned is inputted, all the bytes are regarded as having been inputted. In case that the MIDI message to be entered in the IN FIFO is a running status, the regulating relation on the running status is released and status byte is added to it so that it can be handled as an individual independent MIDI message. (Refer to the MIDI 1.0 specification Document Version. 4.1) In this case, every time each independent MIDI message is made, it is entered in the IN FIFO in sequence.

Also, in case that the read-out MIDI message is a system real time message, it is entered in the Real Time Transfer FIFO in a same manner. Next, the Transfer FIFO empty flag AFSR is set as "0" indicating the Transfer FIFO or the Real Time Transfer FIFO is not "empty" and a real time message transfer process is executed by sending a demand to record to the CD recording unit 24.

In brief, in the MIDI IN interruption processing routine, a transfer processing is executed in case of the MIDI message input through the MIDI bus 21 being equal to the system real time message, and in case of not being the system real time message, it is entered in the IN FIFO.

Figure 8:
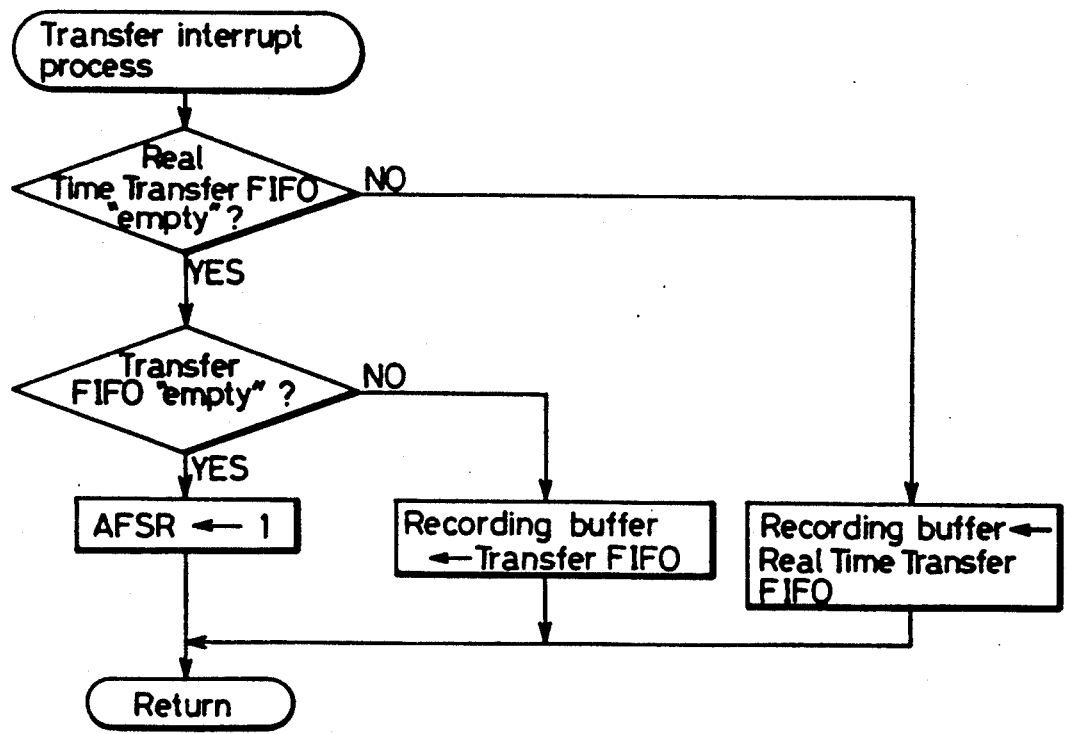

Transfer interruption processing routine (FIG. 8)

A Transfer interruption is requested when a new recording is possible as the CD recording unit 24 finished the previous recording based on the demand to send and the following process is executed.

First, in case that a MIDI message remains in the Real Time Transfer FIFO, 1 byte of the MIDI message is read out from this Real Time Transfer FIFO and the read-out MIDI message is accumulated in the recording buffer of the CD recording unit 24. Next, in case that a MIDI message does not remain in the Real Time Transfer FIFO but remains in the Transfer FIFO, 1 byte of the MIDI message is read out from this Transfer FIFO and this read-out MIDI message is accumulated in the recording buffer of the CD recording unit 24 in a same manner as the afore-mentioned one.

When a MIDI message does not remain in neither the Transfer FIFO or the Real Time Transfer FIFO, the Transfer FIFO empty flag AFSR is set as "1" indicating both of the Transfer FIFO and the Real Time Transfer FIFO are "empty" and the demand to record to the CD recording unit 24 is canceled.

In brief, in the transfer interruption processing routine, the system real time message of MIDI message remaining in the Real Time Transfer FIFO is accumulated in the recording buffer of the CD recording unit 24 on placing priority before others, the transfer FIFO empty flag AFSR is set as "1" when the MIDI message to be sent is running out and thereby the demand to record to the CD recording unit 24 is canceled.

Figure 5:
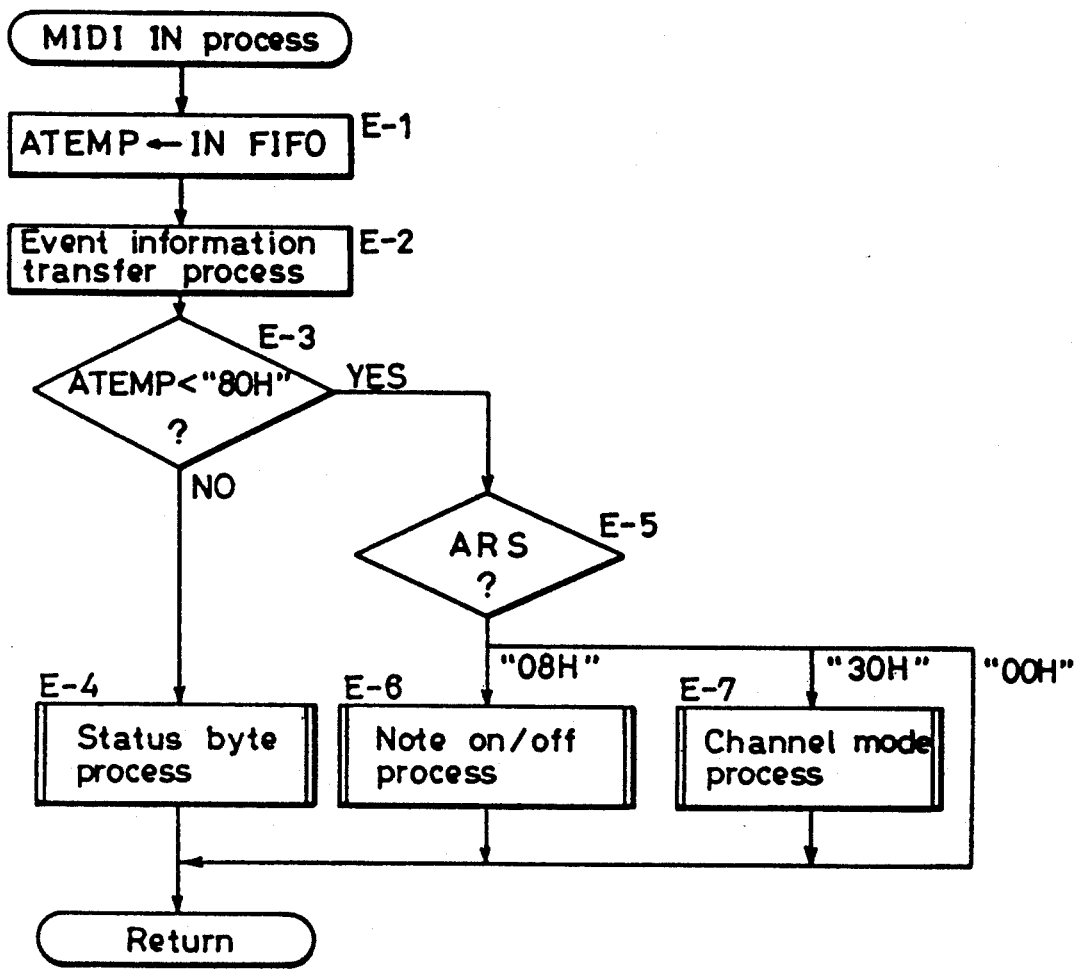

Next, a description is given about the MIDI IN processing routine (Step E) referring to FIG. 5.

E-1. Read out 1 byte of the MIDI message from the IN FIFO and replace the temporary data ATEMP which is transient data in the course of processing with the read-out message.

E-2. By entering the temporary data ATEMP in the Transfer FIFO setting the Transfer FIFO empty flag AFSR as "0" indicating the Transfer FIFO or the Real Time Transfer FIFO is not "empty" and by giving a demand to record to the CD recording unit 24, an event information transfer process is executed. In this way, the MIDI messages including the event information are recorded in the CD by the CD recording unit 24.

E-3. A decision is made as to whether the temporary data ATEMP is less than "80H" or not. In case of less than "80H", go to step E-5 and not less than "80H", go to the next step E-4.

E-4. A status byte processing routine. In case that the temporary data ATEMP is not less than "80H", since the temporary data ATEMP is a status byte, the temporary data ATEMP is decoded and a status byte processing is executed, such as setting a message code ARS indicating the message type of this MIDI message for decoding a data byte to be followed. Details will be described later referring to the flow chart shown on FIG. 9. After the status byte processing, return to the main routine.

E-5. On the decision in step E-3, in case that the temporary data ATEMP is decided to be less than "80H", since the temporary data ATEMP is a data byte, a decision is made as to whether the message code ARS is "00H", "08H" or "30H". In case of "00H", return to the main routine, since the temporary data ATEMP is a data byte of MIDI message corresponding to neither note-one, note-off or channel mode. In case of "08H", go to step E-6. In case of "30H", go to step E-7.

E-6. A note-on/off process routine. In case that the message code ARS is "08H", since the temporary data ATEMP is the data byte corresponding to the note-on or note-off, a note-on, and note-off process of storing and updating the A-note map is executed. Details will be described later referring to the flow chart shown on FIG. 10. After the note-on/off process, return to the main routine.

E-7. A channel mode process routine. In case that the message code ARS is "30H", there is a possibility of the temporary data ATEMP being the data byte corresponding to the all note-off included in the channel mode. Therefore, a channel mode process is executed and in case of all note-off, the A-note map is stored or updated. Details will be described later based on the flow chart shown in FIG. 11. After the channel mode process, return to the main routine.

In brief, in the MIDI IN process routine (Step E), the transfer process of the MIDI messages including the event information which is entered in the IN FIFO is executed and the A-note map is stored and updated.

Next, a description is given on each process routine of status byte process routine (Step E-4), note on/off process routine (Step E-6) and channel mode process routine (Step E-7).

Figure 9:
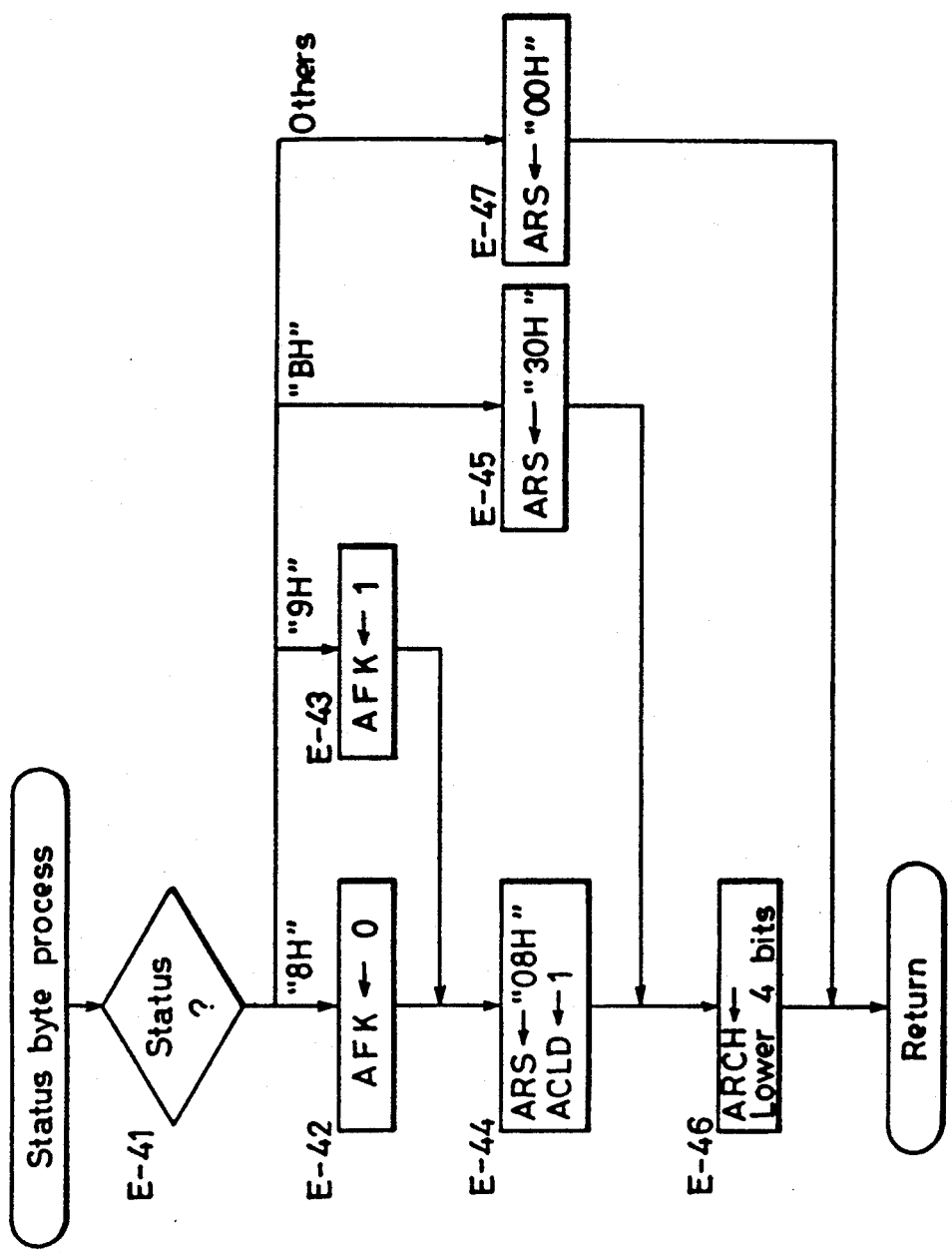

Status byte process routine (Step E-4) (FIG. 9)

E-41. The status of temporary data ATEMP is decided by which one of the "8H", "9H", "BH" or else is the upper four bits of the temporary data ATEMP. In case that these upper four bits are "8H", that is, a note-off status, go to the next step E-42. In case of "9H", that is, a note-on status, go to step E-43. In case of "BH", that is, a channel mode status, go to step E-45. In case of neither "8H", "9H", nor "BH", go to step E-47.

E-42, E-43. On the decision in step E-41, in case that the upper four bits is decided to be "8H," since the status of the temporary data ATEMP is note-off, a note-on flag AFK is set as "0". In case of "9H", since the status of the temporary data ATEMP is a note-on, the note-on flag AFK is set as "1".

E-44. Beside the message code ARS being set as "08H" indicating a note-on or note-of, a data byte step ACLD indicating the decoding step of the data byte of the temporary data ATEMP is set as "1".

E-45. On the decision in step E-41, in case that the upper four bits are decided to e "BH", as the status of the temporary data ATEMP is either channel mode or control change, the message code ARS is set as "30H", hinting the possibility of the channel mode.

E-46. A channel No. ARCH is replaced with the MIDI channel No. represented by the lower four bits of the temporary data ATEMP.

E-47. On the decision in step E-41, in case that the upper four bits are decided to be neither "8H", "9H", nor "BH", the message code ARS is set as "00H" indicating that it is a MIDI message code which does not corresponds to neither note-on, note-off nor channel mode.

In brief, in the status byte process routine (Step E-4), in case that one byte read out from the IN FIFO is a status the decoding of data byte to be followed corresponding to the upper four bits which indicates the status is prepared and the channel No. ARCH is replaced with the lower four bits indicating the MIDI channel No.

Figure 10:
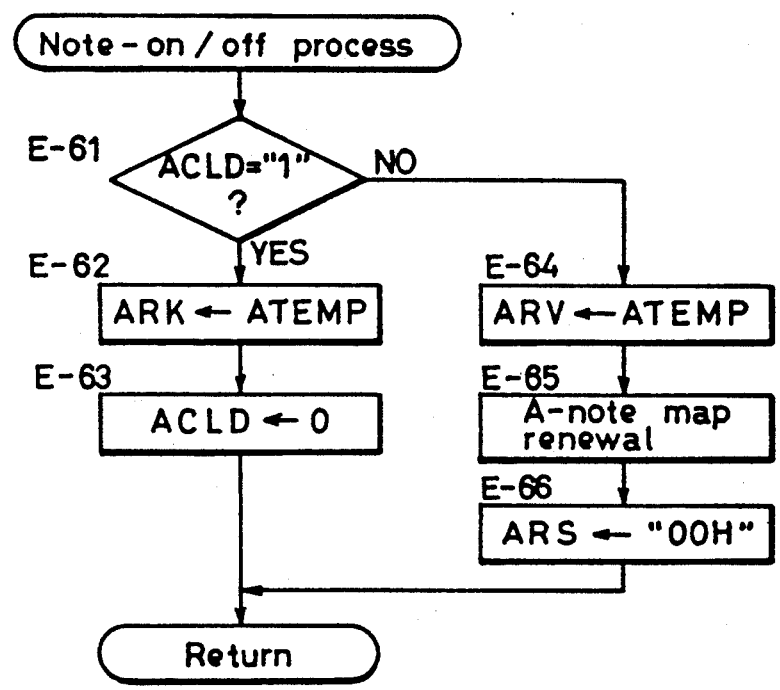

Note-on/off process routine (Step E-6) (FIG. 10)

E-61. A decision is made as to whether the data byte step ACLD indicating the decoding step of the data byte of the temporary data ATEMP is "1" or not. In case of not "1", go to step E-64.

E-62, E-63. On the decision in step E-61, in case that the data byte step ACLD is decided to be "1", since the temporary data ATEMP is a note No. data, note No. ARK being replaced with the temporary data ATEMP and the data byte step ACLD is set as an initial state of "0".

E-64 to E-66. On the decision in step E-61, in case that the data byte step ACLD is decided to be "0", since the temporary data ATEMP is a velocity data, a velocity ARV is replaced with the temporary data ATEMP. Next, the note-on flag and velocity wherein the MIDI channel No. is the channel No. ARCH and the note No. is the note No. ARK in the A-note map, are updated to the content of the note-on flag AFK and velocity ARV and the message code ARS is set as "00H" indicating that it is a MIDI message which does not correspond neither note-on, note-off nor channel mode.

In brief, in the note-on/off process routine (Step E-6), since one byte following the status byte in the MIDI message represents note No. and the next one byte represents the velocity, the A-note map is stored or updated based on these note No. and velocity.

Figure 11:
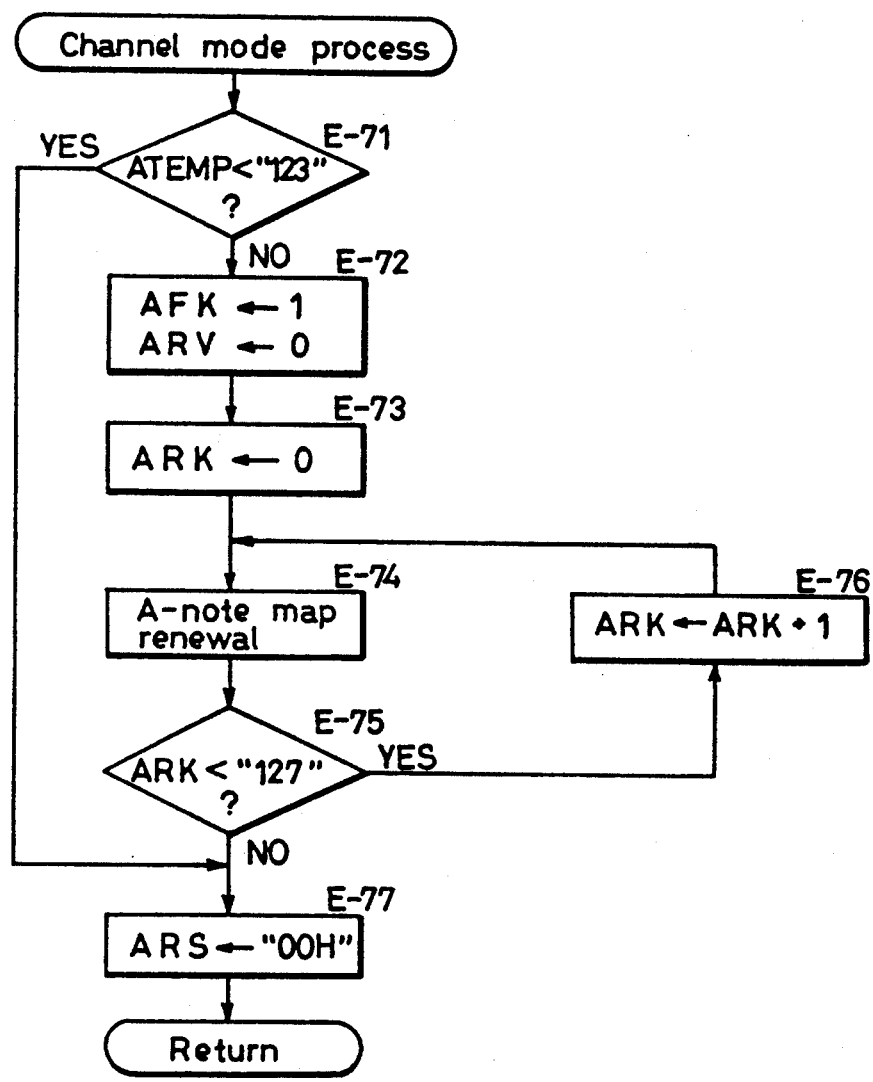

Channel mode process routine (Step E-7) (FIG. 11)

E-71. A decision is made as to whether the temporary data ATEMP is less than "123" or not. In case that the temporary data ATEMP is less than "123", go to Step E-77.

E-72, E-73. On the decision in step E-71, in case that the temporary data ATEMP is decided to be not less than "123", since the MIDI message concerned is the one which requires an all note off process, the note-on flag AFK is set as an initial state of "1" and the velocity is set as an initial state of "0", and the note No. ARK is set as "0".

E-74. Update the note-on flag and velocity wherein the MIDI channel No. is the channel No. ARCH and the note No. is the note No. ARK in the A-note map to the content of the note-on flag AFK and the velocity ARV.

E-75, E-76. A decision is made as to whether the note No. ARK is less than "127" or not. In case that the note No. is less than "127", add "1" to the note No. ARK and return to step E-74.

E-77. On the decision in step E-75, in case that the note No. ARK is decided to be not less than "127", since al note off processes are finished, the message code ARS is set as "00H" indicating that the temporary data ATEMP is the MIDI message corresponding neither note-on, note-off nor channel mode.

In brief, in channel mode routine (Step E-7), in case that the played MIDI message is an all note off, the all note off process is done, that is, the note-on flag and velocity of all the note Nos. wherein the MIDI channel No. in the A-note map corresponds to the channel No. ARCH are initialized.

Figure 6:
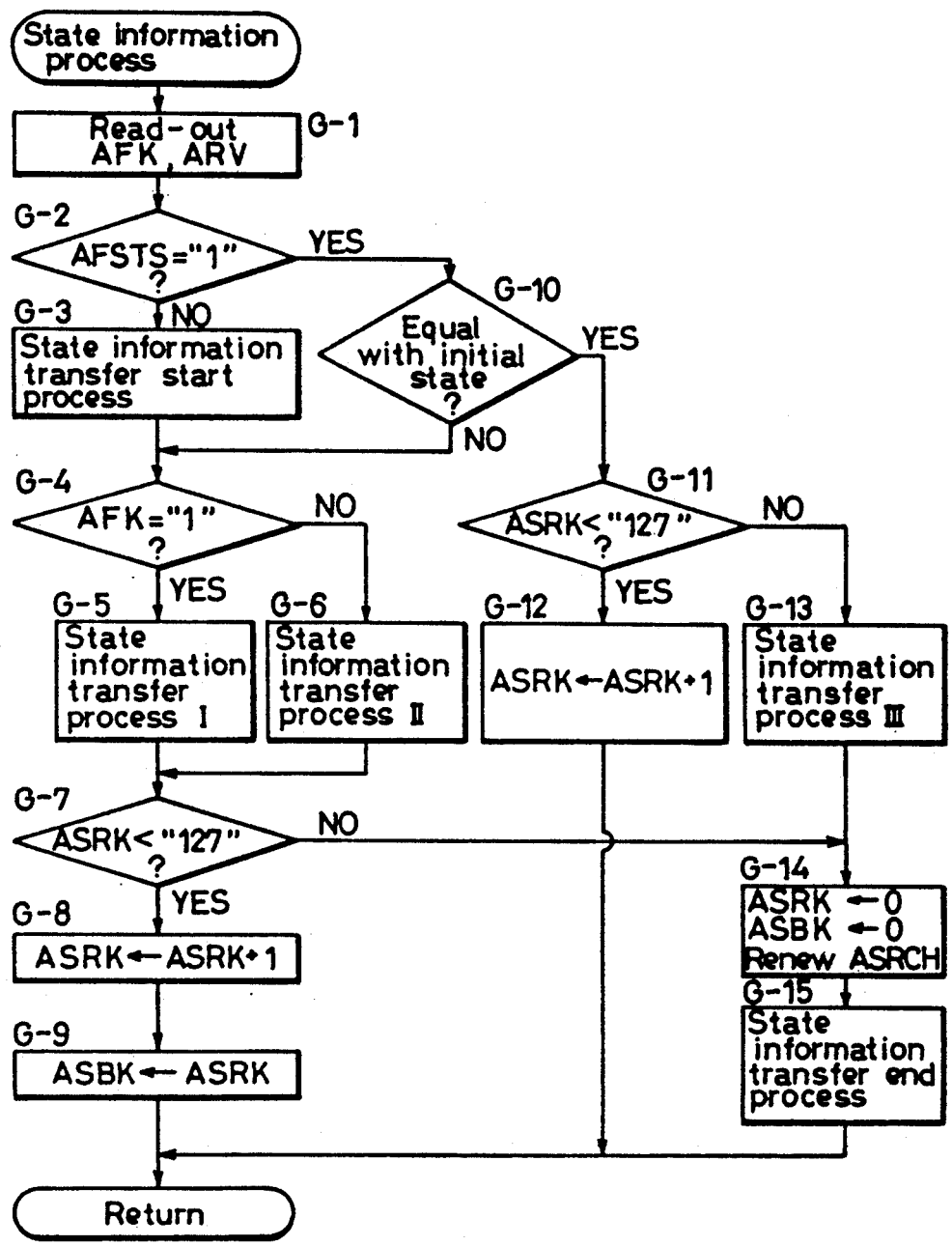

Next, a description on the state information process routine (step G) is given referring to FIG. 6.

State information is recorded and played in conformity to the system exclusive message, and as shown in FIG. 12, the format of the state information comprises the header message consisting of "F0H" indicating the exclusive status, a Manufacture ID (MAN), a Device ID (DEV), a Model ID (MDL) and a Command ID (CMD), a data body consisting of more than one state data and "F7H" indicating the end of system exclusive. In the present embodiment, the Manufacture ID (MAN) is made as "41H" (ID No. of applicant of this invention), the Device ID (DEV) as the state channel No. ASRCH, the Model ID (MDL) as "7EH", the Command ID (CMD) as "12H". The state data comprise the state data type indicating the key-on/off state based on the note-on flag which corresponds to the predetermined note No., note No., velocity and check sum data which correspond to the note No. And the data body comprise one or more state information.

G-1. Read out the note-on flag and velocity of the MIDI channel No. and note No. which correspond to the state channel No. ASRCH and state note No. ASRK in the A-note map, respectively, and replace the note-on flag AFK, the velocity ARV with the read-out note-on flag, and velocity.

G-2. A decision is made as to whether the state information transfer process flag AFSTS is "1", indicating the state information transfer process is under way or not. In case that the state information transfer process flag AFSTS is "1", that is, the state information transfer process is under way, go to step G-10.

G-3. On the decision in step G-2, in case that the state information transfer process flag AFSTS is decided to be not "1", since it indicates that the state information transfer process is not under way, set the state information transfer process flag AFSTS as "1", and execute the state information transfer start process by entering exclusive status up to the Command ID which comprises the header message of status information in the Transfer FIFO sequentially.

G-4 to G-6. A decision is made as to whether the note-on flag AFK is "1" or not. In case that the note-on flag AFK is "1" indicating the note-on, execute the state information transfer process I. In case of not "1", indicating not note-on but note-off, execute the state information transfer process II.

State Information Transfer Process I

First enter "09H" indicating the state data of note-on as a state data type, second the state note No. ASRK and third the velocity ARV sequentially in the Transfer FIFO. Next, enter the check sum data, which is given by taking the complement of 2 for the total sum of "09H", the state note No. ASRK and the velocity ARV, and by setting the MSB bit 7(MSB) as "0", in the Transfer FIFO. The lower seven bits of the total of the check sum data given in this way, "09H", the state note No. ASRK and the velocity ARV are "0". Finally, set the transfer FIFO empty flag AFSR as "0" indicating the transfer FIFO or the Real Time Transfer FIFO is not "empty" and give a demand to record to the CD recording unit 24.

2) State Information Transfer Process II

First enter "08H", indicating the state data of note-off as a state data type, second the state note No. ASRK, and the velocity ARV sequentially in the Transfer FIFO. Next, enter the check sum data which is given by taking the complement of 2 or the total of "08H", the state note No, ASRK and the velocity ARV and by setting the bit 7(MSB) as "0" in the Transfer FIFO. Finally, set the Transfer FIFO flag AFSR as "0" indicating the Transfer FIFO or the Real Time Transfer FIFO is not "empty" and give a demand to record to the CD recording unit 24.

G-7. A decision is made as to whether state note No. ASRK is less than "127" or not. In case that the state note No. ASRK is not less than "127", go to step G-14.

G-8. On the decision in step G-7, in case that the state note No. ASRK is decided to be less than "127", the state note No. ASRK is increased by "1" so that the state information of the next state note No. is processed in the next time.

G-9. Replace the reopened state note No. ASBK with the state note No. ASRK and return to the routine.

G-10. On the decision in step G-2, in case that the state information transfer process flag AFSTS is decided to be "1", indicating that the state information is under process, a decision is made as to whether the note-on flag AFK and the velocity ARV are equal with the initial state wherein the note-on flag AFK is "1" indicating a note-on and the velocity ARV is "0", or the note-on flag AFK is "0" indicating a note-off and the velocity ARV is "64". In case that it is not equal to the initial state, return to step G-4.

G-11 to G-13. On the decision in step G-10, in case that the data is decided to be equal with the initial state, a decision is made as to whether the state note No. ASRK is less than "127" or not. In case that the state note No. ASRK is less than "127", the number of state note No. ASRK is increased by "1" and return to the main routine. In case of not less than "127", execute the state information transfer process III.

3) State Information Transfer Process III

Since the note No. is the final note No. "127" of the MIDI channel concerned, the data are transmitted in order to finish the transmission temporarily. As the data is equal to the initial state, execute the same process with the state information transfer process I after the velocity ARV is set as "0".

G-14, G-15. Since the state information transfer process of the MIDI channel concerned is over, the preparation for a state information transfer process of the next MIDI channel will be executed as follows:

First, set the state note No. ASRK and the reopened state note No. ASBK as "0", an initial state. Next, update the state channel No. ASRCH by adding "1" in case that it is less than "15" and by setting "0" in case that the state channel No. ASRCH is "15".

Next, enter "F7H" of the end of system exclusive indicating the end of transfer in the Transfer FIFO and set the Transfer FIFO empty flag AFSR as "0" indicating that the Transfer FIFO or the Real Time Transfer FIFO is not "empty" and give a demand to record to the CD recording unit 24. Also, set the state information transmit processing flag AFSTS as "0" indicating that state information transfer process is not under way. When the preparation for the state information transfer process of the next MIDI channel is finished, return to the main routine.

In brief, in the state information process routine (Step G), in case of starting the transfer process of the state information, execute the transfer process of the header message of state information first and next the transfer process of the state data. In case of continuing the transmit process, execute the transfer process of the state data without transferring the header message of the state information. When the state data is transferred, the state rote No. ASRK is updated in order to deal with the next process and when reaching the final note No., the transfer process of the state information is finished temporarily.

Further, in transferring the state data, the state data of note No. at the starting time of transfer and the state data of note No. at the ending time of transfer are transmitted regardless of the data is equal to the initial state. In case that the in-between state data is not equal to the initial state, it is transmitted and when it is equal, it is not transmitted and the recording capacity is reduced. Also, the reopened state note No. ASBK is updated only when the data is transferred so that the data amount transferred is minimized at the time of a transmission suspension process in the main routine and the transmission can be reopened from the next note No. of the last state data transferred.

Next, in describing a Receiver FIFO, an OUT FIFO and a Real Time OUT FIFO in the working area which is defined in the B-RAM 33C is given before describing about the function of the performance information playing apparatus 30 constructed in the afore-mentioned manner.

Receiver FIFO

A first in/first out memory (FIFO) to be used for storing the MIDI messages and the state information except for the system real time message read out from the playing buffer of the CD playing unit 31.

OUT FIFO

A first in/first out memory (FIFO) to be used for transferring the MIDI messages except for the system real time message.

Real Time OUT FIFO

A first in/first out memory (FIFO) to be used for transferring the system real time message.

These Receiving FIFO, OUT FIFO and Real Time OUT FIFO are constructed in the similar manner as the afore-mentioned FIFOs and perform the writing in and reading out.

The various registers which store each variable, table, buffer, flag, and pointer or the like are presumed to be assigned to a predetermined area is the B-RAM 33C in the same manner as the A-RAM 22C.

Figure 13:
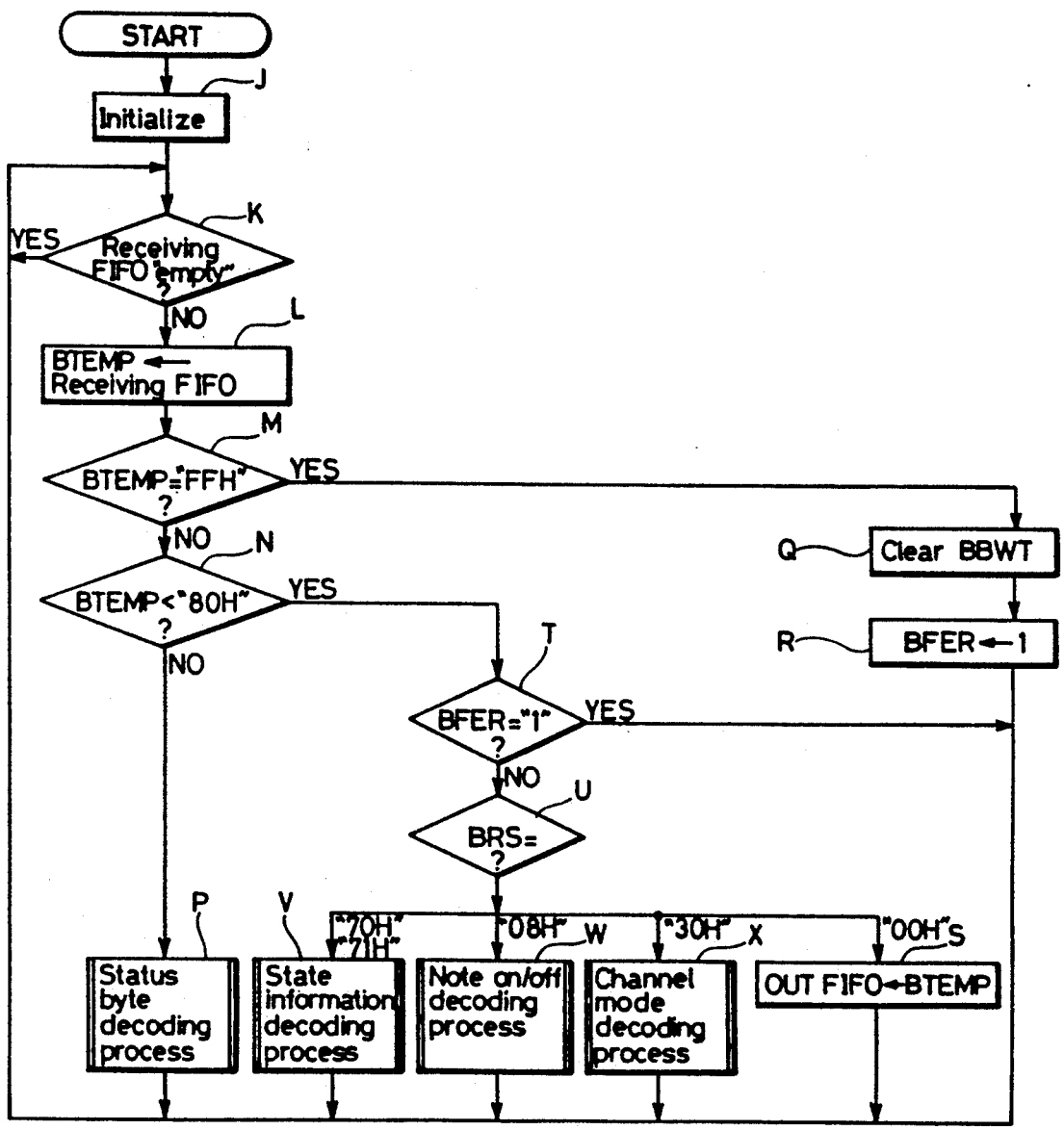

Next, the basic function of the performance information playing unit 30 is described based on the flow chart of a main routine on the playing side as shown in FIG. 13.

J. Power supply is turned on in order to start up execution of the predetermined programs and the contents of the B-RAM 33C are initialized by which the contents of various registers and all FIFOs defined in the B-RAM 33C are cleared and concerning all the note Nos. of all the MIDI channel Nos. on the B-note map, the note-on flag is set as "1" and the velocity is set as "0". Further, the playing buffer of the CD playing unit 31 and the OUT buffer of the B-MIDI circuit 33D are cleared and initialized.

K. A decision is made as to whether the Receiving FIFO of the B-RAM 33C is empty or not. In case of the Receiving FIFO being empty, repeat the step K concerned.

L. On the decision in step K, in case that Receiving FIFO is decided to be not "empty" and the MIDI messages except for the system real time message is entered, one byte of the MIDI message is fallen through from the Receiving FIFO and replace a temporary data BTEMP, which is a temporary data under process with it.

M. A decision is made as to whether the temporary data BTEMP is "FFH", that is, the played data is a playing error mark or not, which is set when the data is an error, in the decoding interruption process routine to be referred to later. In case that the temporary data BTEMP is "FFH", that is, the played data is a playing error mark, go to step Q.

N. On the decision in step M, in case that temporary data BTEMP is decided to be not "FFH", that is, the playing data is not the playing error mark, the temporary data BTEMP is decided to be less than "80H" or not. In case of less than "80H", go to step T and not less than "80H", go to the next step P.

P. A status byte decoding process routine. In case of the temporary data BTEMP not being less than "80H," since the temporary data BTEMP is a status byte, a status byte decoding process is executed such as setting the message code BRS indicating the message type of the MIDI message concerned for decoding a data byte to be followed, by decoding of the temporary data BTEMP. Details will be described later referring to the flow chart shown as FIG. 14. After the status byte decoding process, return to step K.

Q. On the decision in step M, in case that the temporary data BTEMP is "FFH" and the played data is the playing error mark, clear the stand-by buffer BBWT. Further, the stand-by buffer BBWT is the one for storing the temporary data BTEMP temporarily until the finish of decoding the message. It is constituted as a FIFO so that the plural temporary data BTEMP can be recorded sequentially and the writing in and reading out are executed in the same manner as the aforementioned FIFO. The clearing is performed by coinciding the reading out pointer and writing in pointer.

R. Set the playing error flag BFER as "1" indicating that recording/playing error is included in the preceding data and return to step K.

S. On the decision in step U, in case that the message code BARS is decided to be "00H", enter the temporary data BTEMP in the OUT FIFO, enable the the B-MIDI circuit 33D and return to step K.

T. On the decision in step N, in case that the temporary data BTEMP is decided to be less than "80H", that is, it is a data byte and another decision is made as to whether the playing error flag BFER, which is set as "1" in step R at the time of a data processing when include a recording/playing error and set as "0" in the status byte decoding process routine (step P) at the time of starting a new MIDI message, is "1" or not. In case of "1", return to step K, since the preceding data which comprise the MIDI message contains a recording/playing error so that the decoding of the temporary data BTEMP concerned is difficult.

U. On the decision in step T, in case that the playing error flag BFER is decided to be "0", that is, the recording/playing error is not included in the MIDI message, a decision is made as to which one of the "70H", "71H", "08H", "30H", or "00H" is the message code BRS. In case of "70H" or "71H," go to step V. In case of "08H," go to step W. In case of "30H", go to step X. And if it is "00H", return to step S, since the temporary data BTEMP is the data byte of MIDI message which does not correspond to neither state information, note-on, note-off nor channel mode.

V. A State Information Decoding Process routine. In case that the message code BRS is "70H" or "71H", since the temporary data BTEMP is state information or may be state information, execute the state information decoding process. In case of being state information, a comparison is made between the decoded state information and the B-note map. If there is a difference between the two, the B-note map is stored and updated and a process of transferring the MIDI message for amendment is executed. Details will be referred to later according to the flow chart shown in FIG. 15 A, B. After the state information decoding process, return to step K.

W. A note on/off decoding process routine. In case of the message code BRS being "08H", since the temporary data BTEMP is a data byte corresponding to the note-on or a note-off, note on/off decoding process such as storing or updating the B-note map is executed. Details will be referred to later according to the flow chart shown in FIG. 16. After the note-on/off decoding process, return to step K.

X. A channel mode decoding process routine. In case that the message code BRS being the "30H", there is a possibility of the temporary data BTEMP is a data byte corresponding to the all note-off included in the channel mode. Thus, the channel mode decoding process is executed. In case of being all note-off, the B-note map is stored or updated. Details will be referred to later according to the flow chart shown in FIG. 17. After the channel mode decoding process, return to step K.

In brief, based on the MIDI message and state information from the CD playing unit 31, a process of storing and updating the B-note map takes place. Further the transferring process of the MIDI message and MIDI message for amendment to the MIDI bus 34 is executed. If something is wrong with the playing, the updating of the B-note map is stopped. State information itself is not transferred to the MIDI bus 34. At the time word decoding of the MIDI message and the state information, these MIDI message and the state information are not transferred.

Next, a description is given on each interruption process routine of playing interruption process routine, wrong playing interruption process routine. MIDI OUT interruption process routine before describing about each sub-routine of the status byte decoding process routine (Step P), state information decoding process routine (Step V), note-on/off decoding process routine (Step W) and channel mode decoding process routine (Step X).

Playing Interruption Process Routine

A playing interruption is requested when played data which are taken out by the CD playing unit 31 is accumulated in the playing buffer of the CD playing unit 31 and following process is executed.

One byte of played data which is accumulated in the playing buffer is read out. In case that the read-out data body is the MIDI message of system real time message, enter the MIDI message in the Real Time OUT FIFO and enable the B-MIDI circuit 33D. Further, in case of being the MIDI message or state information except for the system real time message, enter that MIDI message or state information to the Receiving FIFO. The same process is executed for the rest of bytes following the second byte and repeat it until all the played data are read out from the playing buffer.

In brief, in the playing interruption process routine, in case that the played data which is read out from the playing buffer of the CD playing unit 31, is a system real time message, a transfer process to the MID bus 34 is executed. In case that the played data the MIDI message or state information except for a system real time message, enter in the Receiving FIFO.

Wrong Playing Interrupt Process Routine

Wrong playing interruption is requested when an error is detected in the CD playing unit 31 and in that case, enter "FFH" as an error mark into the receiving FIFO. Though the system real time message is also a "FFH," since it is a real time message which is not being entered in the Receiver FIFO, it is used as a playing error mark. (Flow chart is omitted)

Figure 18:
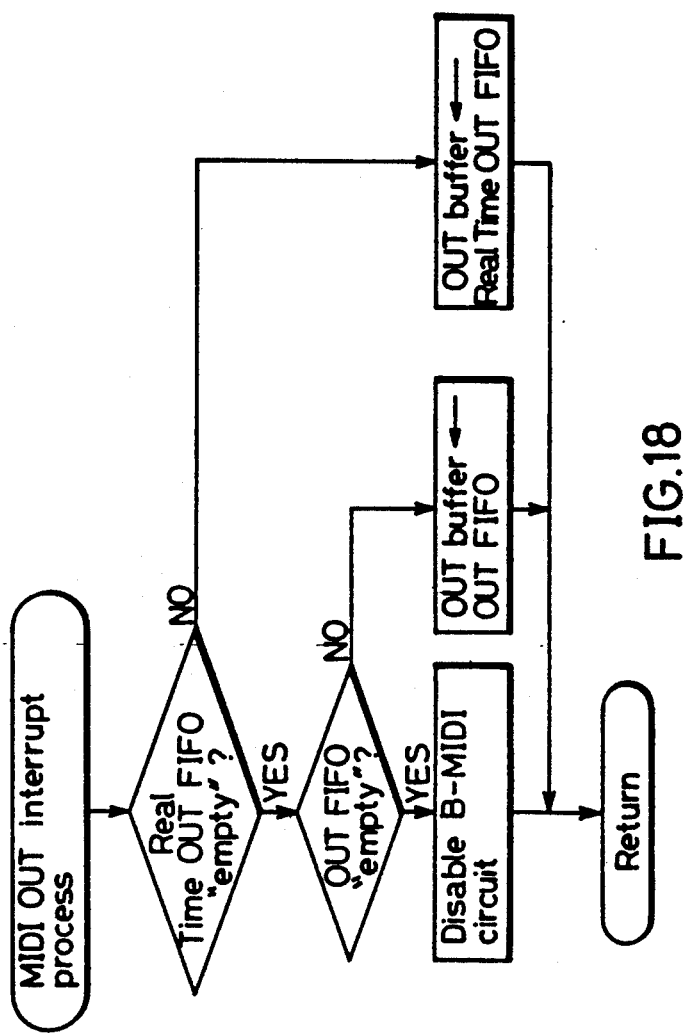

MIDI OUT Interrupt Process Routine (FIG. 18)

A MIDI OUT interruption is requested when the B-MIDI circuit 33D is in an enable condition even after the MIDI message which is read out from the OUT buffer to the MIDI bus 34 was outputted, and the following process is executed.

In case that the system real time message remains in the Real Time OUT FIFO, one byte is taken out from Real Time OUT FIFO and is accumulated in the OUT buffer.

In case that the MIDI message except for the system real time message remain in the OUT FIFO, one byte is taken out from the OUT FIFO and is accumulated in the OUT buffer.

In case that the system real time message does not remain in the Real Time OUT FIFO and the MIDI message except for the system real time messages does not remain in the OUT FIFO, disable the B-MIDI circuit 33D.

In brief, in the MIDI OUT interruption process routine, in case that the system real time message remains, one byte of the system real time message is taken out and is accumulated in the OUT buffer. In case that the system real time message does not remain but the MIDI message except for the system real time message remains, one byte of the MIDI message except for the system real time message is taken out and is accumulated in the OUT buffer.

Figure 14:
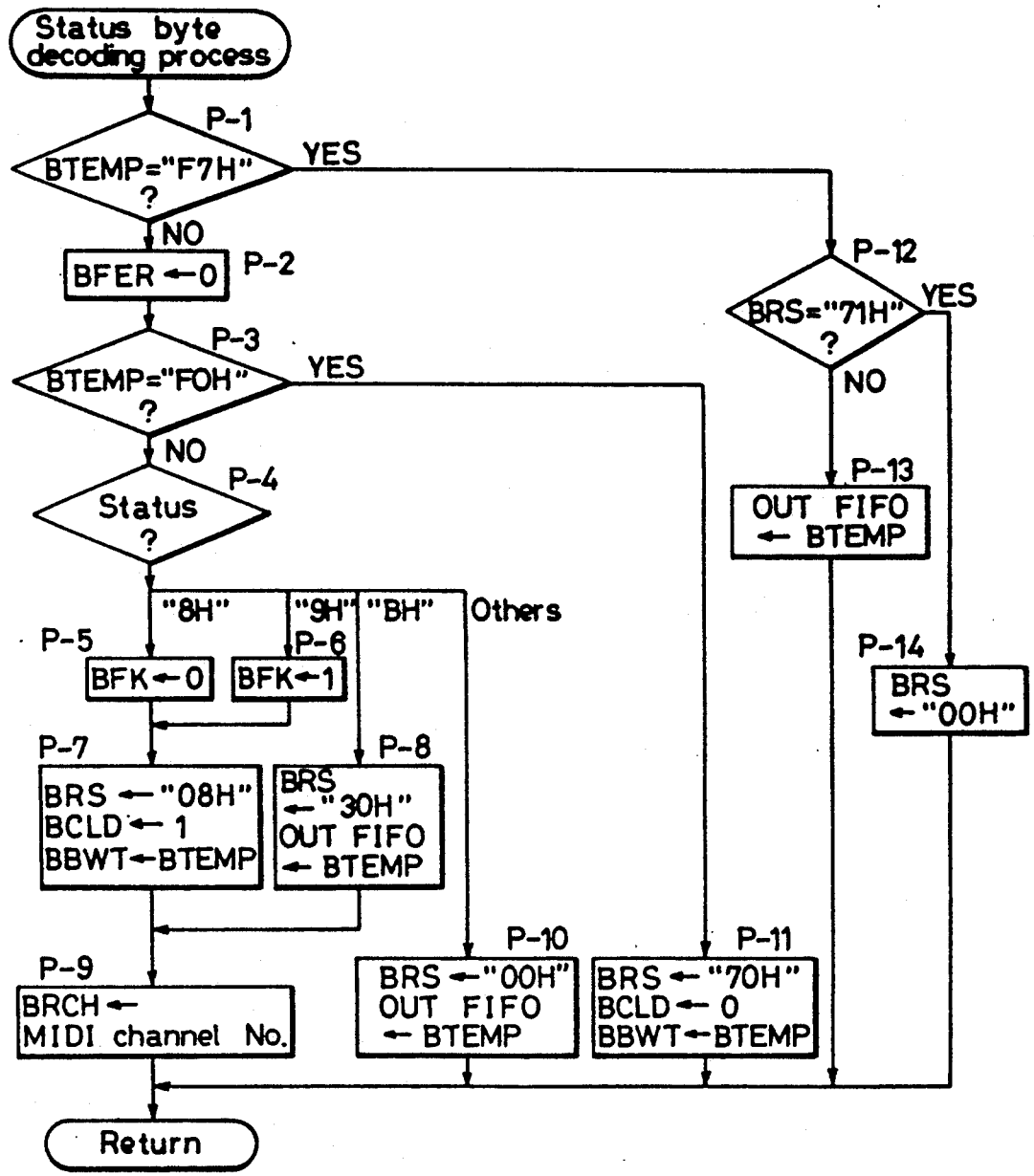

Next, a description is given of the status byte decoding process routine (Step P), referring to FIG. 14.

P-1. A decision is made as to whether the temporary data BTEMP is "F7H", indicating the end of system exclusive or not. In case of "F7H," go to step P-12.

P-2. On the decision in step P-1, in case that the temporary data BTEMP is decided to be not "F7H", since it is a start of a new MIDI message, the playing error flag BFER is set as "0" indicating no recording/playing error is included in the preceding data.

P-3. A decision is made as to whether the temporary data BTEMP is the system exclusive message or the state information of the status "F0H". In case of "F0H", go to step P-11.

P-4 to P-6. On the decision in step P-3, in case that the temporary data BTEMP is decided to be not "F0H", the status of the temporary data BTEMP is decided whether the upper four bits being "8H", "9H", "BH" or other. In case of "8H", since the status of temporary data BTEMP is a note-off, the note-on flag BFK is set as "0". In case of "9H", since the status of the temporary data BTEMP is a note-on, the note-on flag BFK is set as "1". In case of "BH", go to step P-8. In case of neither "8H", "9H", nor "BH", go to step P-10.

P-7. The message code BRS is set as "08H", indicating the note-on or note-off, and the data byte step BCLD indicating the decoding step of data byte of the temporary data BTEMP is set as "1". And the temporary data BTEMP is accumulated in the stand-by buffer BBWT. P-8. On the decision in step P-4, in case that the upper four bits are decided to be "BH", since it is a channel mode or control change, the message code BRS is set as "30H", hinting the possibility of a channel mode, and the temporary data BTEMP is entered in the OUT FIFO. Also, enable the B-MIDI circuit 33D.

P-9. The channel No. BRCH is replaced with the MIDI channel No. represented by the lower four bits of the temporary data BTEMP.

P-10. On the decision in step P-4, in case that the upper four bits are decided to be neither "8H", "9H" nor "BH", the message code BRS is set as "00H". Next, the temporary data BTEMP is entered in the OUT FIFO and the B-MIDI circuit 33D is enabled.

P-11. On the decision in step P-3, in case that temporary data BTEMP is decided to be "F0H", the message code BRS is set as "70H" indicating the header message of system exclusive message or the header message of state information, the data byte step BCLD indicating the decoding step of data byte of the temporary data BTEMP is set as "0" and the temporary data BTEMP is accumulated in the stand-by buffer BBWT.

P-12 to P-14. On the decision in step P-1, in case that the temporary data BTEMP is decided to be "F7H", a decision is made as to whether the message code BRS is "71H" indicating the state information. If not "71H", indicating not the end of the state information, the temporary data BTEMP is entered in the OUT FIFO and enable the B-MIDI circuit 33 D. In case of "71H", indicating the end of the state information, set the message code BRS as "00H".

In brief, in the status byte decoding process routine (step P), a decision is made as to whether one byte of the MIDI message passes through from the Receiver FIFO is the end of system exclusive (F7H) or not. If not, execute the decoding preparation for the data byte to be followed corresponding to the MIDI message.

Figure 15A:
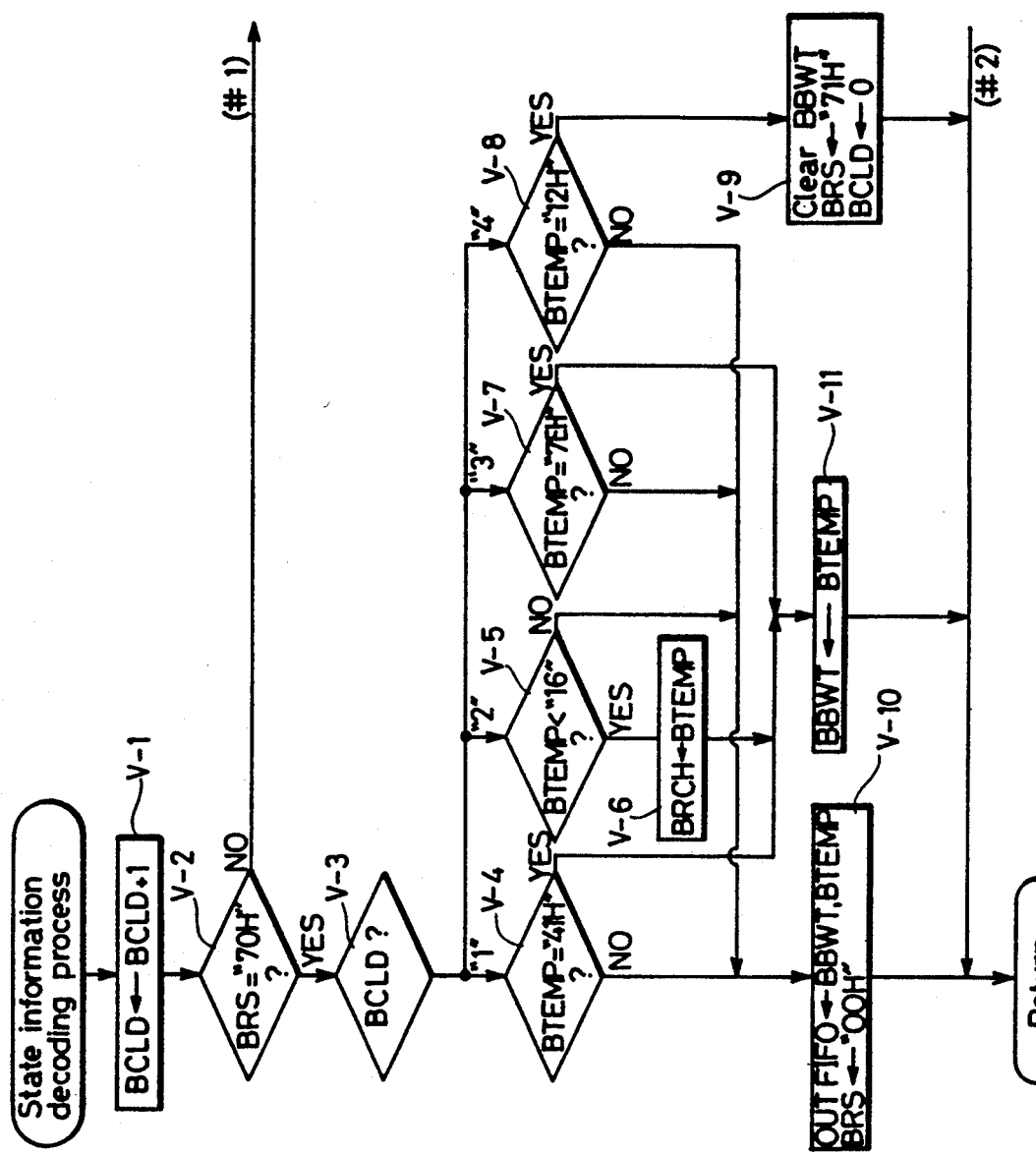
Figure 15B:
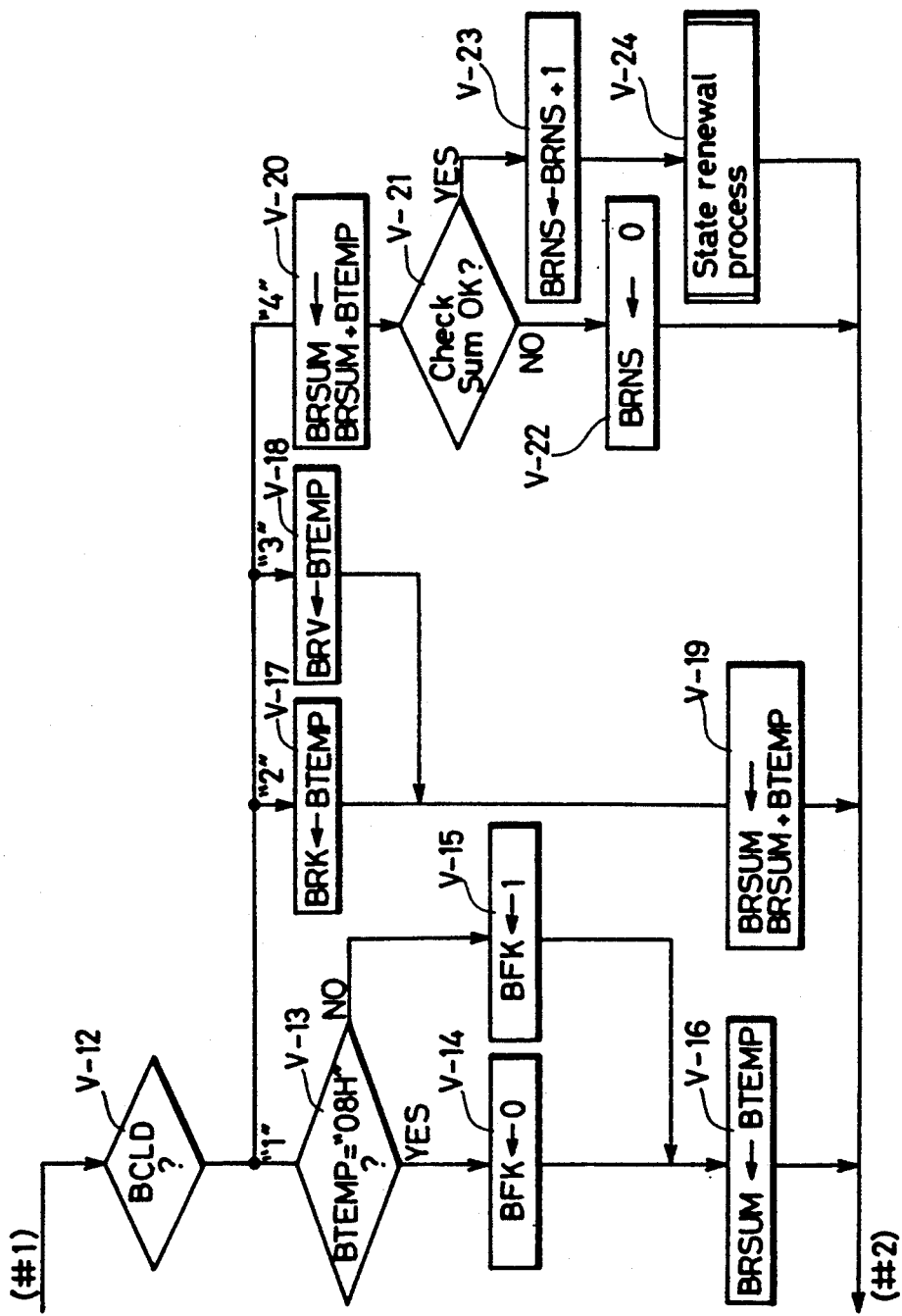

Next, a description is given on the state information decoding process routine (step V), referring to FIG. 15 A, B.

V-1. The data byte step BCLD indicating the decoding step of data byte is increased by "1".

V-2. A decision is made as to whether the message code BRS is "70H" indicating the header message of the system exclusive message or the header message of state information. In case of not "70H", go to Step-12.

V-3. On the decision in step V-2, in case that the message code BRS is "70H", decisions are made as to whether the data byte step BCLD is either "1", "2", "3", or "4". In case of "1", go to the next step V-4, in case of "2", go to step V-5, in case of "3", go to step V-7, in case of "4", go to step V-8.

V-4. On the decision in step V-3, in case that the data byte step BCLD is decided to be "1", since the temporary data BTEMP is the Manufacture ID, a decision is made as to whether this temporary data BTEMP is "41H" or not. If not, go to step V-10. In case "41H", go to step V-11.

V-5, V-6. On the decision in step V-3, in case that data byte step BCLD is decided to be "2", since the temporary data BTEMP is the Device ID, a decision is made as to whether this temporary data BTEMP is less than "16" or not. In case of less than "16", since the MIDI channel No. is employed as the Device ID, the channel No. BRCH is replaced with the temporary data BTEMP. In case of not less than "16", go to step V-10.

V-7. On the decision in step V-3, in case that the data byte step BCLD is decided to be "3", since the temporary BTEMP is the Model ID, a decision is made as to whether this temporary data BTEMP is "7EH". In case of not "7EH", go to step V-10, and in case of "7EH", go to step V-11.

V-8, V-9. On the decision in step V-3, in case that data byte step BCLD is decided to be "4", since the temporary data BTEMP is the Command ID, a decision is made as to whether this temporary data BTEMP is "12H" or not. In case of "12H", clear the stand-by buffer BBWT, set the message code BRS as "71H", set the data byte step BCLD and state data number BRNS as "0" in preparation for the state data, since it is the end of a process of the header message of the state information, and return to the main routine. In case of not "12H", go to step V-10.

V-10. On the decision in step V-4, V-5, V-7 and V-8, in case that the temporary data BTEMP is decided to be not "41H", "7EH", "12H" indicating the state information of the Manufacture ID, Model ID or Command ID, or "less than 16" indicating the state information of device ID, since the temporary data BTEMP is a MIDI message of the system exclusive message, enter the content of the stand-by buffer BBWT by reading it out and the temporary data BTEMP in the OUT FIFO and enable B-MIDI circuit 33D. Next set the message code BRS as "00H" indicating the MIDI message that it does not correspond to neither state information, note-on, note-off nor channel mode and return to the main routine.

V-11. On the decision in step V-4, V-5, and V-7, in case that the temporary data BTEMP is decided to be either "41H", or "7EH", indicating the state information of the Manufacture ID, Model ID, or "less than 16" indicating the state information of device ID, the temporary data BBWT is accumulated in the stand-by buffer BBWT by an additional writing and return to the main routine.

V-12. On the decision in step V-2, in case that the message code BRS is decided to be not "70H", a decision is made as to whether this data byte step BCLD is either "1", "2", "3", or "4". In case of "1", go to step V-13, in case of "2", go to step V-17, in case of "3", go to step V-18 and in case of "4", go to step V-20.

V-13 to V-16. On the decision in step V-12, in case that the data byte step BCLD is decided to be "1", since the temporary data BTEMP is the state data type, a decision is made as to whether this temporary data BTEMP is "08H", indicating a note-off. In case of "08H", set the note-on flag BFK as "0". In case of not "08H" if a note-on, set the note-on flag BFK as "1". Next, the check sum calculation value BRSUM is replaced with the temporary data BTEMP and return to the main routine.

V-17 to V-19. On the decision in step V-12, in case that the data byte step BCLD is decided to be "2", since the temporary data BTEMP is a state note No., replace the note No. BRK with this temporary data BTEMP. In case that data byte step BCLD is "3", since the temporary data BTEMP is a velocity, replace the velocity BRV with this temporary data BTEMP. Next, add the temporary data BTEMP which is a state note No. or velocity, to the check sum calculation value BRSUM and thereby replacing a new check sum calculation value BRSUM with it and return to the main routine.

V-20. On the decision in step V-12, in case that data byte step BCLD is decided to be "4", since the temporary data BTEMP is a check sum data, add this temporary data BTEMP to the check sum calculation value BRSUM and thereby replacing a new check sum value BRSUM with it. Also, in preparation for the next data processing, set the data byte step BCLD as "0".

V-21, V-22. A decision is made as to whether all the bits from bit 0 to bit 6 of the check sum calculation value BRSUM are "0". In case all the bits are not "0", since it is an error data, set the state data number BRNS, which calculate the number of state data normally decoded, as "0" in preparation for the processing of the next state data.

V-23. On the decision in step V-21, in case that all the bits are decided to be "0", indicating all the bits are decoded normally, the state data number BRNS is increased by "1".

V-24. A state renewal process routine. In case that there is a difference between the decoded data and B-note map, update the B-note map and execute the note-on/off information amendment process. Details will be described later referring to the flow chart shown in FIG. 19. After the state update process, return to the main routine.

In brief, in the state information decoding process routine (step V), a decision is made as to whether temporary data BTEMP is a header message of the state information or the exclusive message in step V-2 to V-11. In case of the header message of state information, make the message code BRS indicate a state information. And in case of the header message of exclusive message in the MIDI messages, enter the preceding data accumulated in the stand-by buffer BBWT in the OUT FIFO. Further, give instruction to enter the data to be followed which comprise the exclusive message in the OUT FIFO. In step V-12 to V-24, an amendment process of note-on/off information is executed by doing the decoding process of a state information.

Instead of the process of setting the state data number BRNS as "0" in step V-22, it is possible to ignore the data up to the end of the state information by setting the playing error flag BFER as "1".

Figure 19:
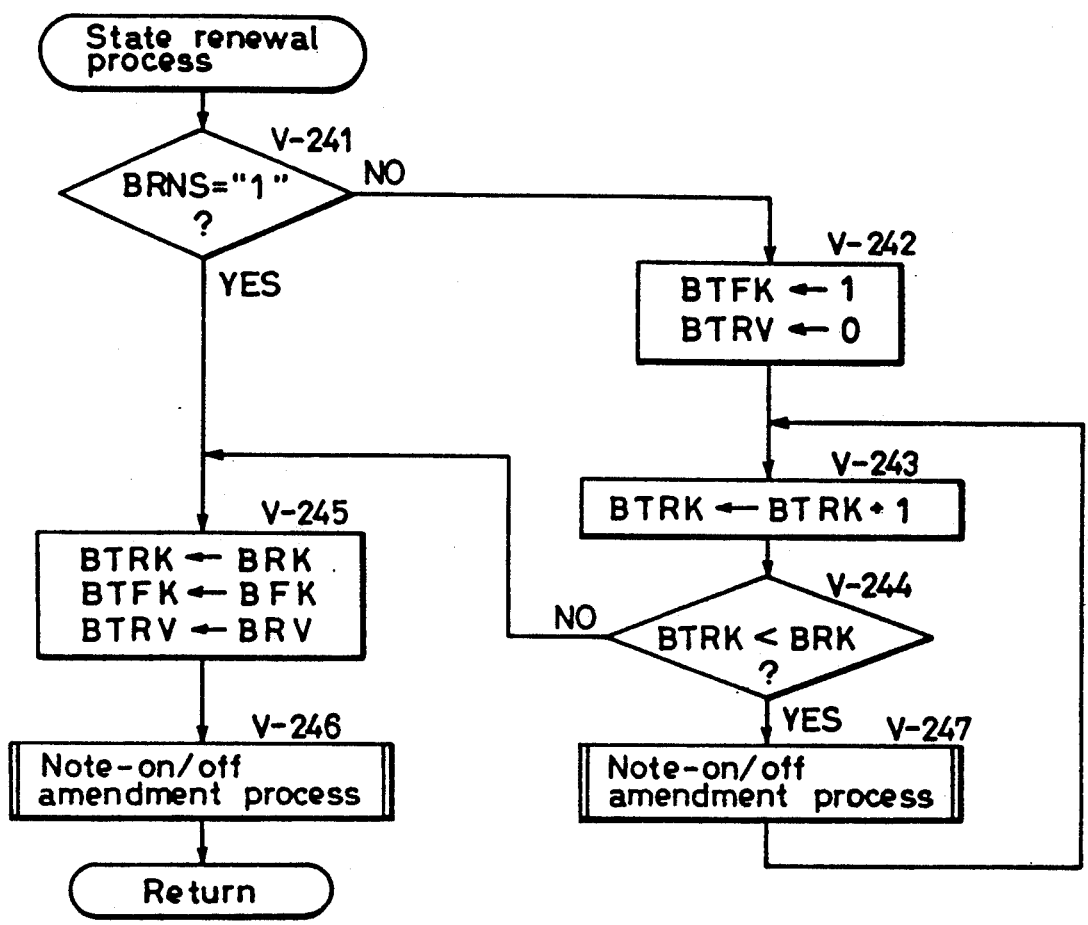

Next, description is given on a state update process routine (step V-24), referring to FIG. 19.

V-241, V-242. A decision is made as to whether the state data number BRNS is "1" or not. In case of not "1", set the note-on flag temporary value BTFK as "1" and set the velocity temporary value BTRV as "0". Further, in case that the state data number BRNS is "1", go to step V-245.

V-243, V-244. A note No. temporary value BTRK is increased by "1" and a decision is made as to whether the increased note No. temporary value BTRK is less than the note No. BRK. In case that the note No. temporary value BTRK is less than the note No, BRK, go to step V-247.

V-245 On the decision in step V-241, in case that the state data number BRNS is decided to be "1", or on the decision in step V-242, in case that the note No. temporary value BTRK is decided to be not less than the note No. BRK, replace the note No. temporary value BTRK with the note No. BRK, the note-or flag temporary value BTFK with the note-on flag BFK and the velocity temporary value BTRV with the velocity BRV.

V-246, V-247. A Note-on/off amendment process routine. The note-on/off amendment process is executed. After the end of the process of step V-246, return to the state information decoding process routine and after the end of the process of step V-247, return to step V-243. Details will be described later referring to the flow chart shown in FIG. 20.

In brief, in the state update process routine (step V-24), in case that the state data number BRNS is "1" or the note No. temporary value BTRK is the same as the note No. BRK concerned, since the state information of the note No. BRK have been given, execute the state information process of the note No. BRK. In case that the state date number BRNS is more than "1" and the note No. temporary value BTRK is not the same as the note No. BRK, execute the state information process, since the state information which has been given is equal to the initial state as for the next note No. of the previous note No. to the previous note No. of the present note No. BRK.

Figure 20:
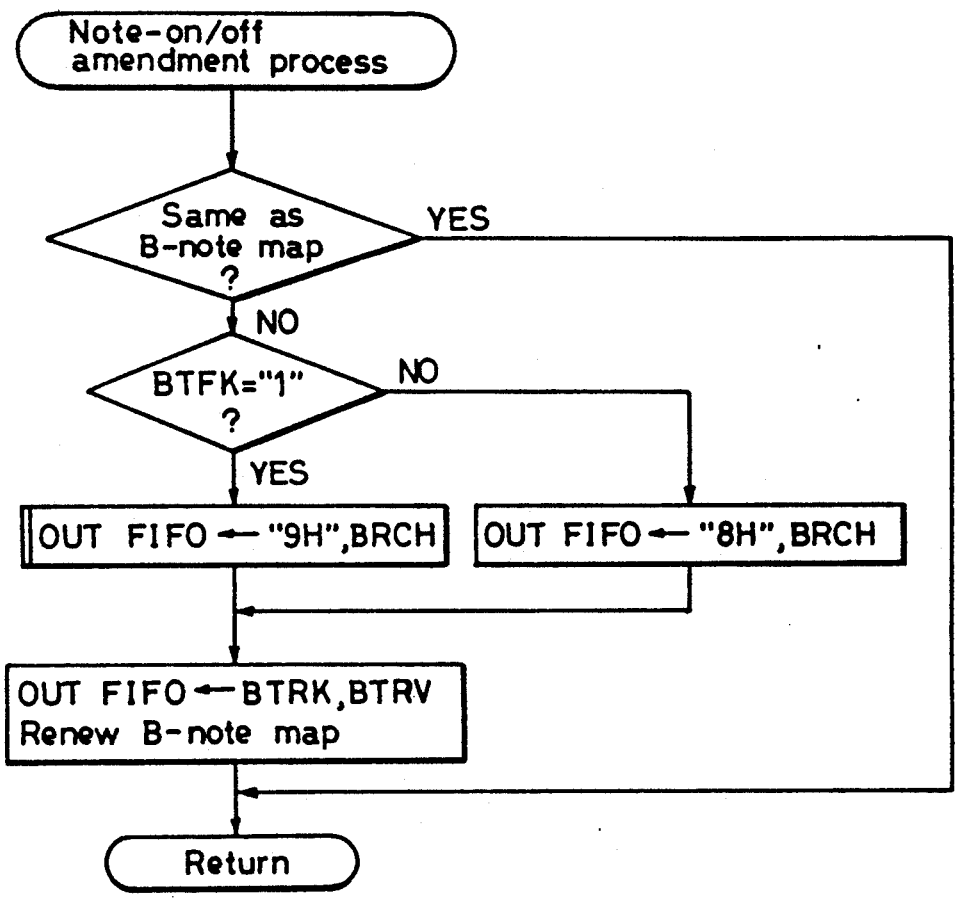

Next, a description is given of the note-on/off process routine (step V-246, V-247), referring to FIG. 20.

A comparison is made between the note-on flag and velocity of the MIDI channel No. which correspond to the channel No. BRCH and of the note No. which correspond to the note No. temporary value BTRK in the B-note map, and the note-on flag temporary value BTFK and the velocity temporary value BTRV. In case of a difference, decision is made as whether the note-on flag temporary value BTFK is "1" or not. In case that the note-on flag temporary value BTFK is "1", enter the one byte in which the upper four bits were set in "9H" and the lower four bits were set in channel No. BRCH, in the OUT FIFO.

In the case that the note-on flag temporary value BTFK is not "1", enter the one byte in which the upper four bits were set in "8H" and the lower four bits were set in channel No. BRCH, in the OUT FIFO.

Next, enter the note No. temporary value BTRK and the velocity temporary value BTRV sequentially in the OUT FIFO, and enable the B-MIDI circuit 33D. And replace the note-on flag and velocity of the MIDI channel No. which correspond to the channel No. BRCH and of the note No. which correspond to the note No. temporary memory value BTRK, in the B-rote map with the note-on flag temporary value BTFK and velocity temporary value BTRV.

As mentioned before, the state in which a note-on flag is "1" and a velocity is "0" and the state in which a note-on flag "0" and a velocity "64" is an equal state indicating the same state.

In brief, in the note-on/off amendment process routine (step V-246, step V-247), in case that the note-on flag and velocity of the B-note map are not the same as the note-on flag temporary value BTRV and velocity temporary value BTRV, the transferring process outputting the MIDI message for amendment to the MIDI bus 34 as a note-on message or note-off message is executed and the B-note map is updated to the note-on flag temporary value BTFK and velocity temporary value BTRV.

Figure 16:
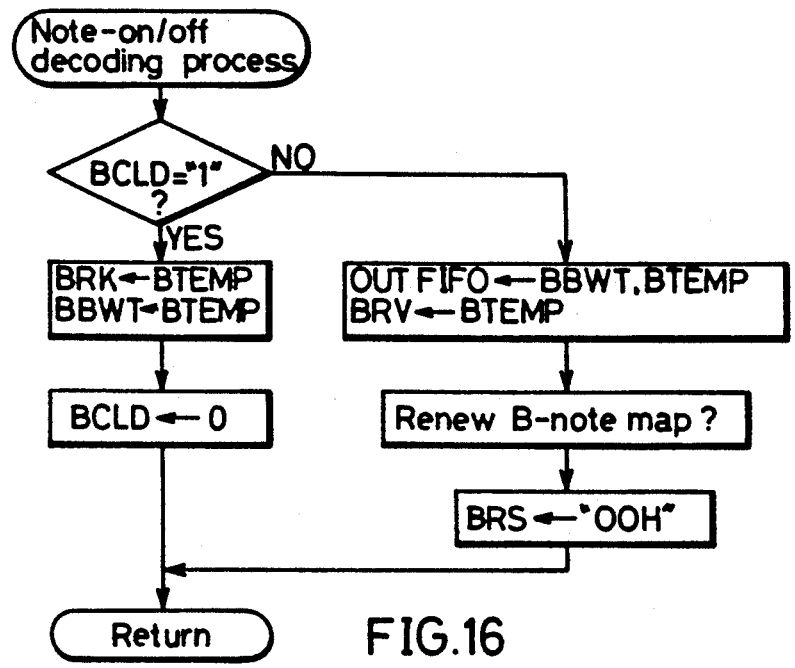

Next, a description is given on the note-on/off decoding process routine, referring to FIG. 16.

A decision is made as to whether the data byte step BCLD is "1" or not. In case of "1", replace the note No. BRK with the temporary data BTEMP, and accumulate it in the stand-by buffer BBWT. Next, the data byte step BCLD is set as an initial state of "0".

In case that the data byte step BCLD is not "1", enter the content of the stand-by buffer BBWT and the temporary data BTEMP in the OUT FIFO, replace the velocity BRV with the temporary data BTEMP, and enable the B-MIDI circuit 33D. Next, replace the note-on flag and velocity of the MIDI channel No. which correspond to the channel No. BRCH and of the note No. which correspond to the note No. BRK in the B-note map with the note-on flag BFK and the velocity BRV. And set the message code BRS as "00H" indicating a MIDI message which does not correspond to either state information, note-on, note-off channel mode since the decoding of data bytes on the note-on or note-off is completed.

In brief, in the note-on/off decoding process routine (step W), the B-note map is stored and updated based on the note No. and velocity, since one byte following the status byte in the MIDI message represents a note No. and following one byte represents a velocity.

Figure 17:
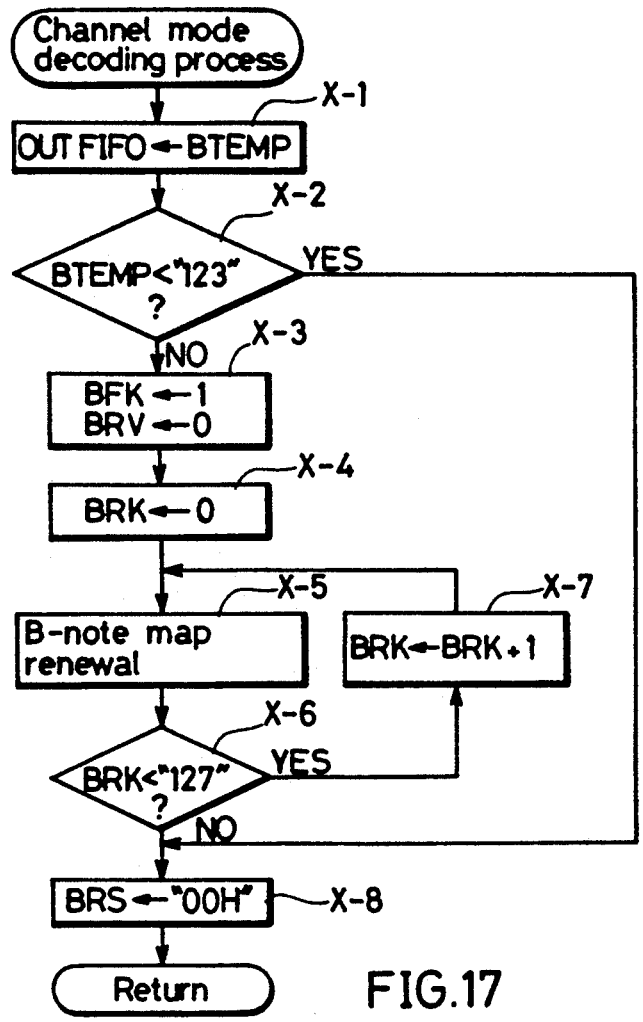

Finally, a description is given on the channel mode decoding process routine (step X), referring to FIG. 17.

X-1, X-2 Enter the temporary data BTEMP in the OUT FIFO and enable the B-MIDI circuit 33D. And a decision is made as to whether the temporary data BTEMP is less than "123" or not. In case that this temporary data BTEMP is less than "123", go to step X-8.

X-3, X-4. On the decision in step X-2, in case that the temporary data BTEMP is decided to be not less than "123", set an initial state by setting the note-on flag BFK as "1" and the velocity BRV as "0". Further, set the note No. BRV as "0".

X-5. Replace the note-on flag and velocity of the MIDI channel No. which correspond to the channel No. BRCH and of the note No. which correspond to the note No. BRK, in the B-note map with the note-on flag BFK and velocity BRV.

X-6, X-7. A decision is made as to whether the note No. BRK is less than "127" or not. In case that that this note No. BRK is less than "127", this note No. BRK is increased by "1" and return to step X-5.

X-8. On the decision in step X-6, in case that the note No. BRK is decided to be not less than "127", since the data byte process of the channel mode is finished, set the message code BRS as "00H".

In brief, in the channel mode decoding process (step X), in case of all note-off, the data which correspond to all the note No. of the MIDI channel No. corresponding to the channel No. BRCH in the B-note map is returned to the initial state.

Next, a description is given of the modified embodiment of the present embodiment.

Arrange an OUT FIFO for amendment and give a space for a transferring flag, which indicates "1" in case that the transferring process of the MIDI message for amendment is necessary and indicates "0" in case that the transferring process of the MIDI message for amendment is not necessary in corresponding to the each note No. in the B-note map. And set the transferring flag of the note No. which is an object of the processing in a note-on/off process and an all note-off process as "0" Further, in the note-on/off amendment process routine (step V-246, V-247), in case that the OUT FIFO is "empty", enter the MIDI message for amendment in the OUT FIFO, and enable the B-MIDI circuit 33D. In case of not "empty", enter it in the OUT FIFO for amendment and it is followed by the update process of the B-note map. In case that OUT FIFO is not "empty", set the transferring flag concerned in the update process of the B-note map as "1". On the decision in step K of the playing main routine, in case that the Receiver FIFO is decided to "empty", a decision is made as to whether the Real Time FIFO and the OUT FIFO are both "empty" or not. In case that the either one is not "empty", return to step K, and in case that both of them are "empty", the MIDI message for amendment which was entered in the OUT FIFO for amendment is passed through sequentially. Next, a decision is made as to whether the transferring flag concerned in the B-note map is "1" or not. In case of "1", enter it in the OUT FIFO and enable the B-MIDI circuit 33D, set the transferring flag concerned as "0" and return to step K. In case of not "1", since it indicates that it was further updated by the note-on/off process or all note-off process after the update process of the B-note map in the note-on/off amendment process routine, this MIDI message for amendment is not transferred and return to step K. In this way, the delay of the other message which is caused by the transfer of the MIDI message for amendment is avoided. Further, in case that the memory capacity of the OUT FIFO for amendment is not large enough, the transferring process for only the MIDI message for amendment of a note-off is executed, when the remaining amount of the OUT FIFO for amendment is few, in order not to cause the trouble of continuing the sound generation, so that the OUT FIFO for amendment does not overflow due to the frequent occurrence of irregularity.

In case that the OUT FIFO for amendment overflows, clear the OUT FIFO for amendment and set the overflow flag as "1" indicating the OUT FIFO for amendment overflowed and set an overflow processing MIDI channel No. BOCH which is an object of overflow process and an overflow processing note No. BORK which is an object of overflow process as "0". Next, on the decision in step K of the main routine on the playing side, in case that the Receiver FIFO is "empty", a decision is made as to whether the Real Time OUT FIFO and the OUT FIFO are both empty or not. In case that either of them is not "empty", return to step K, and in case that both of them are "empty", a decision is made as to whether the overflow flag is "1" or not. In case that this overflow flag is "1", the following overflow process is executed and in case of not "1", the transfer process of the MIDI message for amendment which was entered in the OUT FIFO for amendment as mentioned before, are executed.

1) A decision is made as to whether the transfer flag in which the MIDI channel No. is the overflow processing MIDI channel No. BOCH and the overflow processing note No. is the overflow processing note No. BORK is "1" or not in the B-note map. In case that the transfer flag is "1", go to the next 2) and in case of the transfer flag is not "1", go to 3).

2) Enter the MIDI message for amendment in the OUT FIFO and enable the B-MIDI circuit 33D. And set the transfer flag concerned as "0" and go to the next 3.

3) A decision is made as to whether the overflow processing note No. BORK is "less than "127 or not. In case of less than "127", go to the next 4) and in case of not less than "127", go to 5).

4) Increase the overflow processing note No. BORK by "1" and return to step K.

5) Set the overflow processing note No. BORK as "0" and go to the next 6).

6) A decision is made as to whether the overflow processing MIDI channel No. BOCH is less than "15" or not. In case of less than "15", go to the next 7) and in case of not less than "15", go to 8).

7) Increase the overflow processing MIDI channel No. BOCH by "1" and return to step K.

8) Set the overflow processing MIDI channel No. BOCH and the overflow flag as "0", and return to step K.

Further, the data about the amendment which occurred while executing the process based on the B-note map is entered in the OUT FIFO for amendment an processed at the time of restarting. In case that it is transferred while executing the process based on the B-note map, since the amendment flag is "0", it will not be transferred twice. As to the other processes, they are the same with the present embodiment.

Second Embodiment:

Next, a description is given of the embodiment wherein performance data, which is made by a sequencer or the like and includes the multiple note-on which is a key-on state of several keys by the musical tone of the same note No. at the same time being made, can be processed, focusing on the differences from the first embodiment and omitting the overlapping parts. In the first embodiment, state information is recorded and played in accordance with the system exclusive message. In the present embodiment, since it is sufficient if the state information is discerned, the header message consists of only "F4H" indicating the status. Also, the data body comprises a byte of state data type, a note No., a velocity, a note-on number and check sum data. "F7H" indicating the end of system exclusive in the first embodiment is not used. In the byte of state data type in this data body, the state data type is indicated by the upper four bits and the MIDI channel No. is indicated by the lower four bits. In case of being the MIDI channel No. as "nH", the byte of state data type is indicated by subtracting "80H" from the status byte of the note-on/off message, as being a note-off as "0nH" and a note-on as "1nH".

The A-note map in the present embodiment comprises MIDI channel Nos. and note Nos. as address. The note-on flags and velocities which are stored and updated by the key-on/-off informations, in the A-note map in the first embodiment, as shown in FIG. 3, and further, the note-on number, which indicates the number of note-on, corresponding to those MIDI channel Nos. and note Nos. The same can be said about the B-note map. Besides these A-note map and B-note map, a C-note map which has the similar constitution with the A-note map and the B-note map and is basically stored and updated by state information defined in the B-RAM 33C.

Next, the differences between the first embodiment in each routine is described in the following. On the Side of Performance Information Recording Device 20

Main Routine

In the present embodiment, due to the multiple note-on data processing, in step A, the note-on number on all the note Nos. of all the MIDI channel Nos. in the A-note map is set as "0" and a process of initial setting is added. Further, corresponding to the change of the construction of a state information process, in order to enable to deal with the plural MIDI channel in the state information process consecutively, step D is changed as follows.

D. On the decision in step C, in case that the state information transfer processing flag AFSTST is decided to be "1" indicating the state information is under the transfer. The state information transfer processing flag AFSTS is set as "0" indicating the end of transfer process.

Further, replace the state channel No. ASRCH indicating the MIDI channel No. being an object of state information process with the reopened state channel No. ASRCH indicating the MIDI channel No. being an object of the state information process at the time of restarting the transfer and replace the state note No. ASRK with the reopened state note No. ASBK, so that the next note No. of the previous transfer will be transferred at the time of restarting the transfer.

State Information Process Routine

In the present embodiment, in corresponding to the change of the constitution of state information, and in order to enable the processing plural MIDI channel consecutively and to enable the processing multiple note-on data in the state information process, in step G-1, the note-on number on the MIDI channel No. and note No. corresponding to the state channel No. ASRCH and state note number ASRK is read out and the process of replacing the note-on number ANN with the read-out note-on number is added. And in step G-9, a process of replacing the reopened state channel No. ASBCH with the state channel No. ASRCH is added. Further, in step G-10, in deciding whether the note-on flag AFK and velocity ARV is equal with the initial state or not, in addition to the conditions of the note-on flag AFK and velocity ARV, in case that the note-on number is "0", a process for deciding it is equal with the initial state is added. In addition to eliminating step G-14 and step G-15, step G-3 and step G-5 (step G-6) are changed as follows besides step G-16 is added between step G-11 and step G-13 and step G-17 to step 19 are being added.

G-3. On the decision in step G-2, in case that the state information transfer processing flag AFSTS is not "1", since it indicates that the state information transfer process is not under way, set the state information transfer processing flag AFSTS as "1" and execute the state information transfer start process by entering the "F4H" of the header message of state information in the Transfer FIFO.

G-5(G-6). State Information Transfer Process I(II)

First, enter the state data type byte wherein the upper four bits are set as "1H (OH)", indicating a note-on (note-off), and the lower four bits are set as the state channel No. ASRCH in the Transfer FIFO. Next enter the state note No. ASRK, the velocity ARV and the note-on number ANN sequentially in the Transfer FIFO. Next, enter the check sum data which is given by taking the two's complement of the total of the state data type byte, state note No. ASRK, velocity ARV and note-on number ANN and by setting the bit 7 (MSB) as "0" in the Transfer FIFO. Further, the lower 7 bits of the total of the check sum data obtained in the above-mentioned way, state data type byte, state note No. ASRK, velocity ARV and note-on number ANN are "0". Finally, the Transfer FIFO empty flag AFSR is set as "0" indicating the Transfer FIFO or the Real Time Transfer FIFO are not empty and give a demand to record to the CD recording circuit 24.

G-16. On the decision in step G-11, in case that the state note No. ASRK is decided to be not less than "127", since the process of state information of the MIDI channel concerned was finished, a decision is made as to whether the state channel No. ASRCH is less than "15" or not. In case of less than "15", go to step G-18, in case of not less than "15", go to step G-13.

G-17. On the decision in step G-7, in case that the state note No. ASRK is decided to be not less than "127", since the process of state information of the MIDI channel concerned was finished, a decision is made as to whether the state channel No. ASRCH is less than 15 or not. In case of not less than "15", go to step G-19.

G-18. On the decisions in step 3-16 and step G-17, in case that the state channel No. ASRCH is decided to be less than "15", preparation for the process of state information of the next MIDI channel is executed as follows.

Set the state note No. ASRK and the reopened state note No. ASBK as "0". Next, by adding "1" to the state channel No. ASRCH, replace a new state channel No. ASRCH and a reopened state channel No. ASBCH with them. After the preparation for the process of state information of the next MIDI channel is finished, return to the main routine.

G-19. In step G-13, in case that the process of state information transfer process III was finished or in case that the state channel No. ASRCH is decided to be not less than "15" in step G-17, since the state channel No. ASRCH is the final MIDI channel No. "15" and the note No. is the final note No. "127", set the state note No. ASRK and the reopened state note No. ASBK as "0". Further, set the state channel No. ASRCH and the reopened state channel No. ASBCH as "0", and return to the main routine.

Note-on/off Process Routine

In the present embodiment, the following process is added in step E-65.

A decision is made as to whether the note-on flag AFK is "1" and the velocity ARV is "0" or the note-on state AFK is "0", or not. In case that this note-on flag AFK is "1" and the velocity ARV is not "0", the note-on number of the MIDI channel No. and note No. corresponding to the MIDI channel No. ARCH and note No. ARK in the A-note map is increased by "1". In case that the note-on flag AFK is "1" and the velocity ARV is "0" or the note-on flag AFK is "0", a decision is made as to whether the note-on number of the MIDI channel No. ARCH and note No. corresponding to the MIDI channel No. ARCH and note No. ARK in the A-note map is "0" or not. In case that this note-on number is not "0", the note-on number is decreased by "1" and in case of "0", the note-on number remains as it is.

Channel Mode Process Routine

In the present embodiment, in order to process the multiple note-on data, in step E-74, a process of setting the note-on number of the MIDI channel No. and note No. corresponding to the MIDI channel No. ARCH and note No. ARK in the A-note map as "0" is added.

On the side of Performance Information Playing Device 30 Main Routine

In the present embodiment, in order to process the multiple note-on data, in step J, a process of initialization by setting the note-on number on all the note-on Nos. of all the MIDI channel Nos. in the B-note map as "0", and a process of initialization by setting the note-on flag as "1", the velocity as "0" and the note-on number of as "0", on all the note Nos. of all the MIDI channel Nos. in the C-note map, is added. Further, in corresponding to the change of constitution of a state information process and the change of process of state renewal process, step K, step S, step U and Step V are changed as follows:

K. A decision is made as to whether the Receiving FIFO defined in the B-RAM 33 is "empty" or not. In case of "empty", go to step Y. As to step Y, a description is given later.

S. On the decision in step U, in case that the message code BRS is decided to be "00H", the temporary data BTEMP is temporarily accumulated in the stand-by buffer BBWT and a decision is made as to whether all byte of the MIDI message concerned is played or not.

In case of playing all, each byte is read-out from the stand-by buffer BBWT sequentially and enter it in the OUT FIFO and the B-MIDI circuit is enabled. In case of not playing all, no special process is executed.

U. On the decision in step T, in case that the playing error flag BFER is decided to he "0", since it indicates that the recording/playing error is not included in the MIDI message, a decision is made as to whether the message code BRS is either "71H" "08H" "30H" or "00H". In case that this message code BRS is "71H", go to the next step V, in case of "08H", go to step W and in case of "30H", go to step X. In case of "00H", since the temporary data BTEMP is the data byte of MIDI message which does not correspond to neither state information, note-on, note-off nor channel mode, return to step S.

V. A state information decoding process routine. In case that the message code BRS is "71H", since the temporary data BTEMP is state information, a state information decoding process is executed.

State Byte Decoding Process Routine

In the present embodiment, in step P-2, in corresponding to the change of constitution of state information and the change of process of state update process, a decision is made as to whether the stand-by buffer BBWT is "empty" or not. In case that this stand-by buffer BBWT is not "empty", enter each byte which is read out sequentially from the stand-by buffer BBWT in the OUT FIFO and enable the B-MIDI circuit 33. In case of "empty", a process of executing not special process is added. In step P-8 and step P-10, instead of the process of entering the temporary data BTEMP in the OUT FIFO and enabling the B-MIDI circuit 33 D, the process of accumulating temporarily the temporary data BTEMP in the stand-by buffer BBWT is executed. Also, step P-12 and step P-14 are eliminated and in case that the temporary data BTEMP is decided to be "F7H" in step P-1, go to step P-13. Further, step P-3, step P-11 and step P-13 are changed as follows:

P-3. A decision is made as to whether the temporary data BTEMP is the status "F4H" of state information. In case of "F4H", go to step P-11.

P-11. On the decision in step P-3, in case that the temporary data BTEMP is decided to be "F4H", set the message code BRS as "71H" indicating the header message of state information and set the data byte step BCLD indicating the decoding step of data byte of the temporary data BTEMP and the state data number BRNS as "0".

P-13. On the decision in step P-1 in case that temporary data BTEMP is decided to be "F7H", since it indicates the end of system exclusive message, accumulate the temporary data BTEMP in the stand-by buffer BBWT temporarily. And by reading out each byte sequentially from this stand-by buffer BBWT, enter them in the OUT FIFO and enable B-MIDI circuit 33D.

State Information Decoding Process Routine

In the present embodiment, in corresponding to the change of the constitution of state information, step V-2 to V-11 are eliminated. Further, step V-12 to V-16 and step V-20 are changed as follows and step V-25 is added.

V-12. After the processing of step V-1, a decision is made as to whether the data byte step BCLD is either "1" "2" "3" "4" or 5". In case of "1", go to the next step V-13, in case of "2", go to step V-17, in case of "3", go to to step V-18, in case of "4", go to step V-25 and in case of "5", go to step V-20.

V-13 to V-16. On the decision in step V-12, in case that the data byte step BCLD is decided to be "1", since the temporary data BTEMP is the type of state data, a decision is made as to whether the upper four bits of the temporary data BTEMP are "0H" indicating a note-off. In case of "0H", indicating a note-on, set the note-on flag AFK as "0". In case of not "0H", since it indicates a note-on, set the note-on flag BFK as "1" and replace the channel No. BRCH with the lower four bits of the temporary data BTEMP and replace the check sum calculation value BRSUM with the temporary data BTEMP and return to the main routine.

V-20. On the decision in step V-12, in case that the data byte step BCLD is decided to be "5", since the temporary data BTEMP is the check sum data, add this temporary data BTEMP to the check sum calculation value BRSUM and replace a new checksum calculation value BRSUM with it. In preparation for the next data process, set the data byte step BCLD as "0".

V-25. On the decision in step V-12, in case that the data byte step BCLD is decided to be "4", since the temporary data BTEMP is the note-on number, replace the note-on number BNN with temporary data BTEMP and return to step V-19.

Note-on/off Decoding Process Routine

Figure 21:
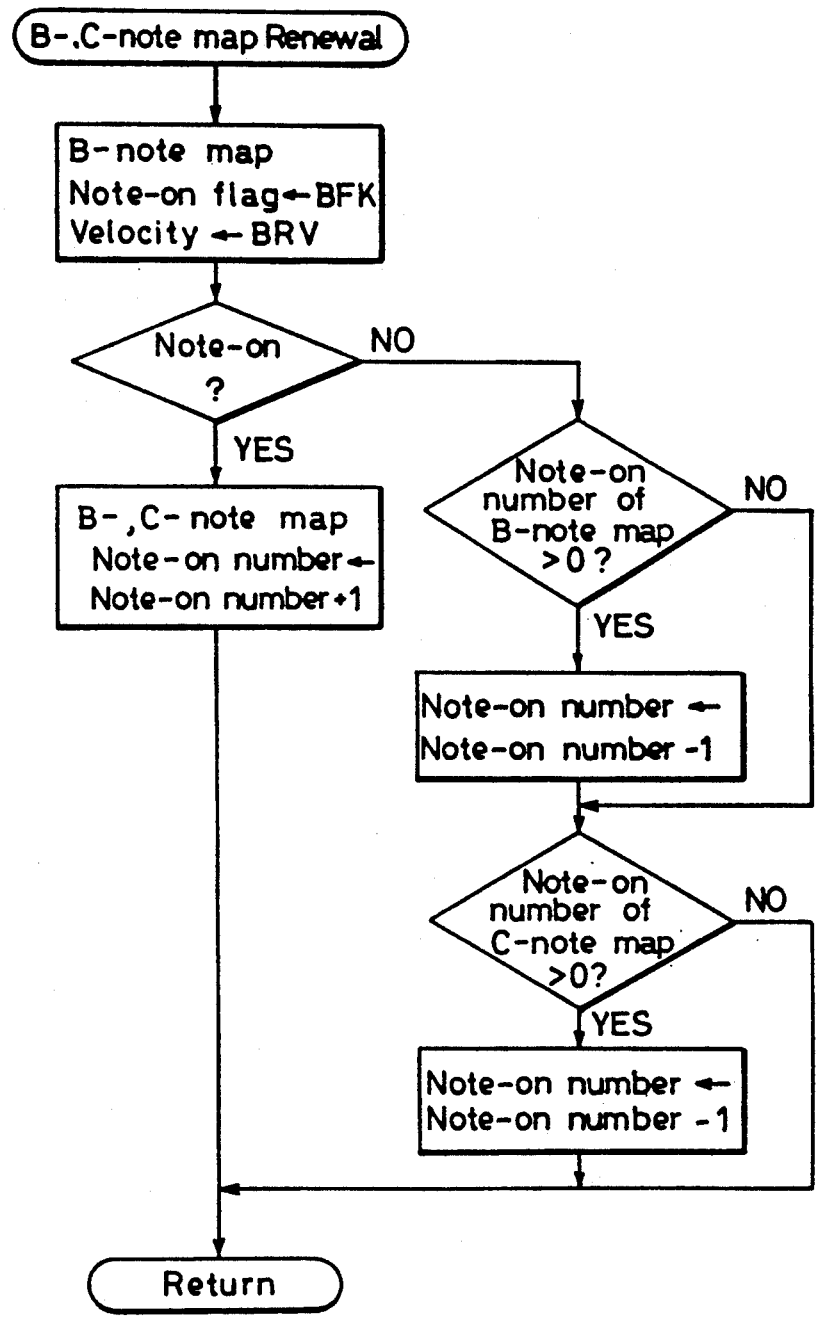
FIGS. 21, 22A and 22B are drawings for explaining a second embodiment of a performance information recording/playing apparatus in accordance with the present invention and are flow charts of a B- and C-note map renewal routine and a state amendment routine.

In the present embodiment, in order to process the multiple note-on data, "B-note map update" step in the note-on/off decoding process routine is changed to the B-, C- note map update process routine shown in FIG. 21.

Next, a description is given on the B-, C-note map update process routine.

First, the note-on flag and velocity of the MIDI channel No. and note No. corresponding to the channel, No. BRCH and note No. BRK in the B-note map are updated to the note-on flag BFK and velocity BRV. Next, a decision is made as to whether the note-on flag BFK is "1" and the velocity BRV is "0", or the note-on flag BFK is "0", or not. In case that the note-on flag BFK is "1" and the velocity BRV is not "0", the note-on number of the MIDI channel No. and note No. corresponding to the channel No. BRCH and note number BRK in the B-note map and the C-note map is increased by "1" and return to the note-on/off decoding process routine.

And in case that the note-on flag BFK is "1" and the velocity BRV is "0", or the note-on flag BFK is "0", a decision is made as to whether the note-on number of the MIDI channel No. and note No. corresponding to the channel No. BRCH and note number BRK in the B-note map is more than "0", in case that this note-on number is more than "0", the note-on number is decreased by "1". Next, a decision is made as to whether the note-on number of the MIDI channel No. and note No. corresponding to the channel No. BRCH and note No. BRK in the C-note map is more than "0" or not. In case of more than "0", the note-on number is decreased by "1" and return to the the note-on/off decoding process routine.

Channel Mode Decoding Process Routine

In the present embodiment, in order to process multiple note-on data, a process of seating the note-on number BNN as "0" in step X-3 and setting the note-on number of the MIDI channel No. and note No. corresponding to the channel No. BRCH and note No. BRK in the B-note map and the C-note map as "0" in step X-5 are added.

State Renewal Process Routine

In the present embodiment, in corresponding to the change of process of the state update process, in step V-242, the process of setting the note-on number temporary data BTNN as "0" is added, and in step V-245, the process of replacing the channel No. temporary value BTRCH with the channel No. BRCH and replacing the note-on number temporary value BTNN with the note-on number BNN are added. And step V-243, step V-244, step V-246 and step V-247 are changed as follows:

V-243. First, a decision is made as to whether the note No. temporary value BTRK is less than "127" or not. In case of less than "127", the note No. temporary value BTRK is increased by "1" and go to step V-244. In case of not less than "127", after setting the note No. temporary value BTRK as "0". A decision is made as to whether the channel No. temporary value BTRCH is less than "15" or not. In case of not less than "15", set the channel No. temporary value BTRCH as "0" and go to step V-244. In case of less than "15" the channel No. temporary value BTRCH is increased by "1", and go to step V-244.

V-244. A decision is made as to whether the channel No. temporary value BTRCH is the channel No. BRCH and the note No. temporary value BTRK is the note No. BRK or not. In case that the channel No. temporary value BTRCH is not the channel No. BRCH or the note No. temporary value BTRK is not the note No. BRK, go to step V-247. In case that the channel No. temporary value BTRCH is the channel No. BRCH and the note No. temporary value BTRK is the note No. BFK, go to step V-245.

V-246, V-247. The note-on flag, velocity and note-on number of the MIDI channel No. and note No. corresponding to the channel No. temporary value BTRCH and note No. temporary value BTRK in the C-note map are updated to the content of the note-on flag temporary value BTFK, velocity temporary value BTRV, note-on number temporary value BTNN. After the process of step V-246, return to the state information decoding process routine and after the process of step V-247, return to step V-243.

Figure 22A:
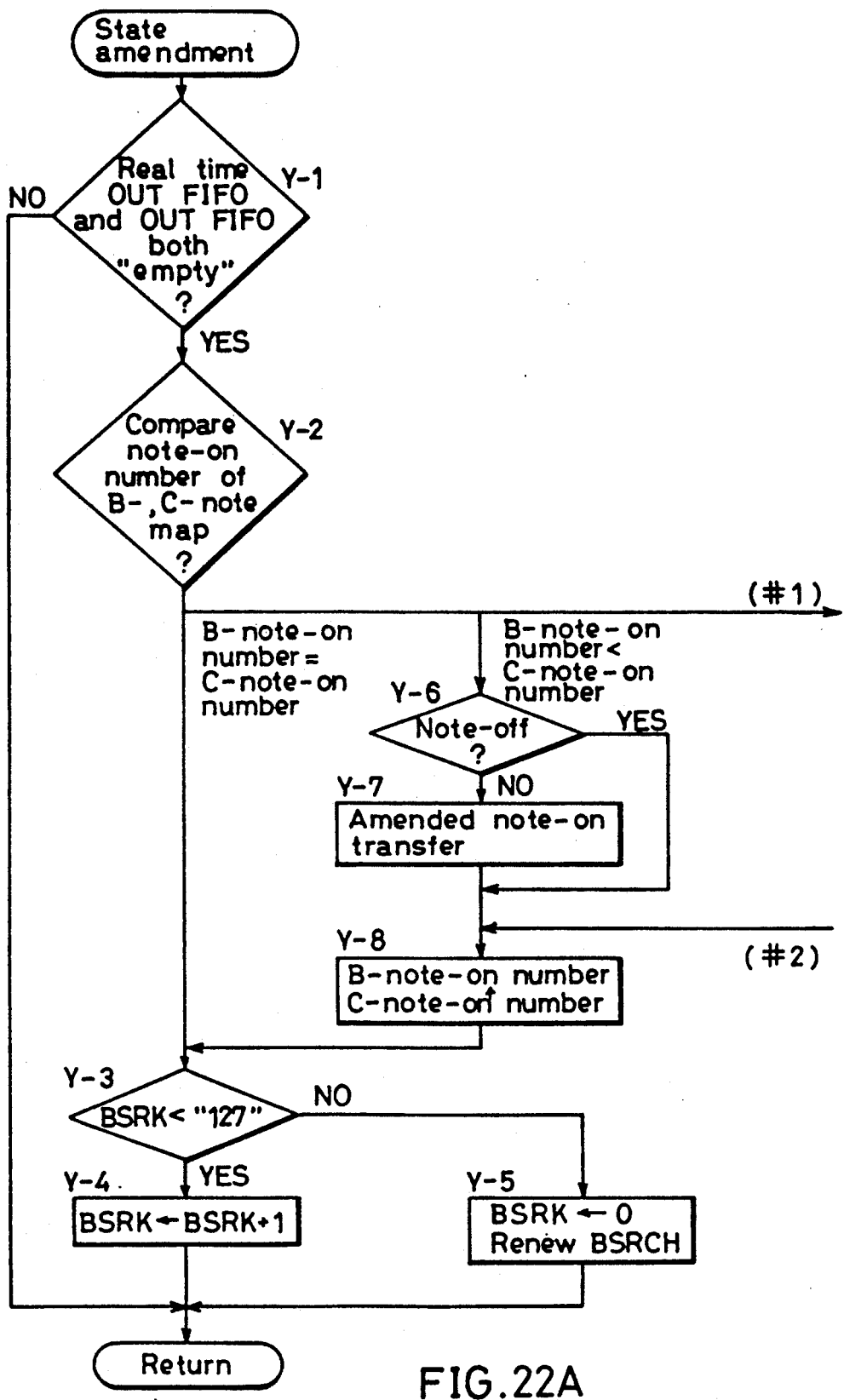
Figure 22B:
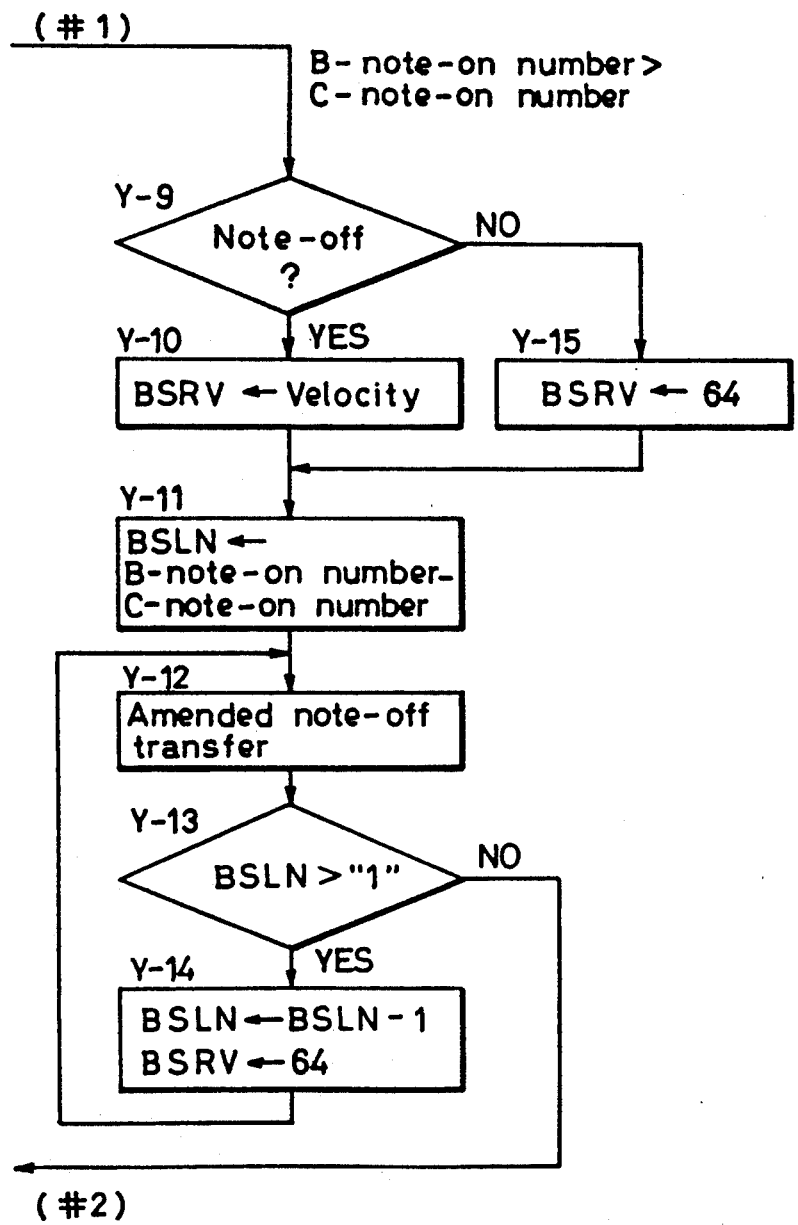

Next, in the present embodiment, a description is given of the state amendment (step Y) to be added for the change of process of the state update process, referring to FIG. 22 A, B.

Y-1. A decision is made as to whether the Real Time OUT FIFO and the OUT FIFO are both "empty". In case of not "empty", return to step K.

Y-2. On the decision in step Y-1, in case that both of the Real Time OUT FIFO and the OUT FIFO are decided to be "empty", a comparison is made between the note-on number of the MIDI channel No. and note No. corresponding to the state amendment channel No. BSRCH and state amendment note No. BSRK in the B-note map and the note-on number of the MIDI channel No. and the note No. corresponding to the state amendment channel No. BSRCH and state amendment note No. BSRK in the C-note map is made. In case that note-on number of the B-note map and the note-on number of the C-note map is the same, go to step Y-3, the note-on number of the B-note map is less than the note-on number of the C-note map, go to step Y-6, the note-on number of the B-note map is more than note number of the C-note map, go to step Y-9.

Y-3. On the decision in step Y-2, in case that the note-on number of the B-note map and the note-on number of the C-note map is the same, a decision is made as to whether the state amendment note No. BSRK is less than "127" or not. In case of not less than "127", go to step Y-5.

Y-4. On the decision in step Y-3, in case that the state amendment note No. BSRK is less than "127", the state amendment note No. BSRK is increased by "1" and return to step K.

Y-5. On the decision in step Y-3, in case that the state amendment note No. BSRK is not less than "127", first set the state amendment note No. BSRK as "0". Next, in case that the state amendment channel No. BSRCH is less than "15", this state amendment channel No. BSRCH is increased by "1", and in case of not less than "15", the state amendment channel No. BSRCH is renewed by being set as "0" and return to step K.

Y-6. On the decision in step Y-2, in case that the note-on number of the B-note map is decided to be less than the note-on number of the C-note map, a decision is made as to whether the note-on flag of the MIDI channel No. and note No. corresponding to the state amendment channel No. BSRCH and state amendment note No. BSRK in the C-note map is "1" and the velocity of the MIDI channel No. and note No. is "0" or the note-on flag is "0" or not. In case that the note-on flag is "1" and the velocity is "0", or the note-on flag is "0", go to step Y-8.

Y-7. On the decision in step Y-6, in case that the note-on flag is decided to be "1" and the velocity is decided not to be "0", one byte wherein the upper four bits are set as "9H" and the lower four bits are set as the channel No. BSRCH is entered in the OUT FIFO and the state amendment note No. BSRK in the OUT FIFO. Next, the velocity of the MIDI channel No. and note No. corresponding to the state amendment channel No. BSRCH and state amendment note No. BSRK in the C-note map is entered in the OUT FIFO and the B-MIDI circuit 33 D is enabled.

Y-8. The note-on number of the MIDI channel No. and note No. corresponding to the state amendment channel No. BSRCH and state amendment note No. BSRK in the B-note map is updated to the note-on number of the MIDI channel No. and note No. corresponding to the state amendment channel No. BSRCH and state amendment note No. BSRK in the C-note map.

Y-9. On the decision in step Y-2, in case that the note-on number of the B-note map -s decided to be more than the note-on number of the C-note map, a decision is made as to whether the note-on flag of MIDI channel No. and note No. corresponding to the state amendment No. BSRCH and state amendment note No. BSRK in the C-note map is "1" and the velocity of the MIDI channel No. and note No. is "0", or the note-on flag is "0". In case that the note-on flag is "1" and the velocity is not "0", go to step Y-15.

Y-10. On the decision in step Y-9, in case that the note-on flag is decided to be "1" and the velocity is decided to be "0", or the note-on flag is "0", the state amendment velocity BSRV indicating the amendment velocity is replaced with the velocity of the MIDI channel No. and note No. corresponding to the state amendment channel No. BSRCH and state amendment note No. BSRK in the C-note map.

Y-11. The amendment note-off number BSLN indicating the note-off number which requires an amendment is replaced with a value given by subtracting the note-on number of the MIDI channel No. and note No. corresponding to the state amendment channel No. BSRCH and state amendment note No. BSRK in the C-note map from the note-on number of the MIDI channel No. and the note No. corresponding to the state amendment channel No. BSRCH and the state amendment channel No. BSRK in the B-note map.

Y-12. First, one byte wherein the upper four bits are set as "8H" and the lower four bits are set as the state amendment channel No. BSRCH entered in the OUT FIFO and next the state amendment note No. BSRK in the OUT FIFO. Next, the state amendment velocity BSRV is entered in the OUT FIFO and the B-MIDI circuit 33D is enabled.

Y-13. A decision is made as to whether the amendment note-off number BSLN is more than "1" or not. In case of not more than "1", return to step Y-8.

Y-14. On the decision in step Y-13, in case that the amendment note-off number BSLN is more than "1", the amendment note-off number BSLN is decreased by "1" and the state amendment velocity BSRV is set as "64", return to step Y-12.

Y-15. On the decision in step Y-9, in case that the note-on flag is decided to be "1" and the velocity is decided not to be "0", set the state amendment velocity BSRV as "64".

In brief, in the state amendment routine (step Y), a comparison of the note-on number is made between the B-note map and the C-note map. In case of the same number, it is regarded to be played normally. When the note-on number of the C-note map is more than that of the B-note map, the note-on data is regarded to be missing and when the note-on number of the C-note map is less than that of the B-note map, the note-off data is regarded to be missing. In both cases, amend the B-note map and transfer the amendment data. In transferring, in case that there is the corresponding data in the C-note map in transferring, transfer the data. In case that the note-on data is missing with no corresponding data, the amendment data is not transferred. And in case of losing the note-off, transfer the velocity by making it a standard velocity.

Next, a description is given of the modified example of the present embodiment.

Arrange an OUT FIFO for amendment and give a space for an amendment flag in which "1" is indicated when the state amendment process is necessary and "0" is indicated when the state amendment process is not necessary in corresponding to the each note No. in the C-note map. The processes of clearing the OUT FIFO for amendment and setting the note No. of the amendment flag which is an object of processing in the C-note map as "0" are added to all note-off process.

Further, in the state update process routine (step V-246, V-247), in the update process of the C-note map, the processes of entering the channel No. temporary value BTRCH and the note No. temporary value BTRK sequentially in the OUT FIFO for amendment and setting the amendment flag of note No. which is an object of the processing as "1" are added.

In addition, in the state amendment process routine, before the process of step Y-2, the following process are executed.

First, take out one byte from the OUT FIFO for amendment and make it as the state amendment channel No. BSRCH and take out another one byte and make it the state amendment note No. BSRK. Next, a decision is made as to whether the amendment flag of the MIDI channel No. and the note No. which correspond to the state amendment channel No. BSRCH and the state amendment note No. BSRK in the C-note map is "1" or not, and in case of "1", set the corresponding amendment flag in the C-note map as "0" and go to step Y-2. And in case of not "1", return to step K. Further, in step Y-2, in case that the note-on numbers of the B-note map and the C-note map are same, or when step Y-8 is finished, instead of advancing to the step Y-3, return to step K. Accordingly, step Y-3 to step Y-5 are not necessary.

It can be changed to the same process which is executed in the modified example of the first embodiment when the amendment FIFO overflows.

In the first and second embodiments, between the performance information recording device 20 and the performance information playing device 30, in other words, for the CD, in order to secure the reliability, it is desirable not to use the running status. On the other hand, in the MIDI bus 21 and 34, it is desirable to use the running status properly in order to transmit more data. Therefore, in the performance information recording device 20, it is desirable to add the status byte to the data to which the running status process was given and in the performance information playing device 30, it is desirable to give the running status process. In the first and second embodiment in order to eliminate the complicated description, the running status process was not given in the performance information playing device 30.

In the first and second embodiments, the note-on flag and the velocity are recorded and played as the state information and if it is necessary, further information can be added. For example, in case that the connected sound generating unit generates a musical tone in which its tone and volume change with the course of time from key-on time such as the musical tone of percussive sounds, the time data indicating the time passed from the key-on is also recorded and from the performance information playing device 30, the note-on amendment message wherein the velocity value which is amended based on the time data indicating the time passed from the key-on is transferred. Also, an amendment message for musical tone indicating the temporary change of the musical tone to be generated in the sound generating device based on the time data indicating the time passed from the key-on is also transferred. To be concrete, the content of processing is changed as follows:

Arrange an area for storing the time data indicating the time passed from the key-on corresponding to each note No. in the A-note map in the performance information recording device 20. Next, clear the time data which is stored in this area based on the input of the note-on message of the note No. corresponding to the time data and increase it at a every predetermined time under the process of the A-micro computer 22. Further, state data added with this time data which indicates the time passed from the key-on are recorded.

Next, in the performance information playing device 30, in case of the first embodiment, in transferring the note-on amendment message in the note-on/off amendment routine, the velocity value which is amended based on the time data indicating the time passed from the key-on which is included in the state data is transferred. Also, the amendment message for musical tone indicating the temporary change of the musical tone to be generated at the sound generating device at the time of a transmission note-on amendment message. In the second embodiment, arrange an area for storing a time data indicating the time passed from the key-on corresponding to the each note No. in the C-note map in the same way as arranged in the performance information recording device 20 and the data which is stored in the area is replaced with a time data indicating the time passed from the key-on which is included in the state data of the note No. corresponding to the time data. Next, increase the data at a every predetermined time under the process of the B-micro computer and in transferring the note-on amendment message, the velocity value which is amended based on the time data is transferred. Also, the musical tone amendment message is transferred together.

The content of the afore-mentioned amendment message is decided to be fixed in a way that differences of the characteristics of the musical tone originally scheduled to be generated by the missing note-on message and the one to be generated actually by the amendment message are minimized. This amendment message of note-on is transferred behind the originally scheduled timing at which the missing note-message is transferred. Accordingly, in a case that the connected sound generating device generates the musical tone of percussive sounds, the originally scheduled musical tone is decayed at the time of actual generation due to the amendment message of note-on. In order to cope with the advancement of the decaying, according to the characteristics of the musical tone to be generated by the sound generating device to be connected, for example, the velocity is changed to a small one in order to deal with the change of sound volume caused by decaying or the MIDI channel No. is changed to a MIDI channel No. which is set in advance in order to generate the musical tone in accordance with the change of the musical tone.

In this way, a better result is obtained than simply replacing the missing note-on message with the amendment message Further, the same can be said about the off-velocity.

In the first and second embodiment, at the time of restarting the transfer of the state information after the process of state information transfer cancellation, the state information corresponding to the note No. next to the previous transfer is transferred. However, the restarting process can be simplified by reopening the transfer from the state information corresponding to the note No. which is not equal with the initial state and next to the note No. of the previous transfer.

Though in the first and second embodiment, all the note Nos. of all the channel Nos. are arranged to be recorded and played, in case of being able to specify the range of use, only the state information within the range of use can be recorded and played. The setting of the range of use can be done by arranging the manually operable member in the performance information recording device 20 or the change of setting can be done by a receiving MIDI message. Further, by watching the MIDI channel of event information from the MIDI bus 21 in the performance information recording device 20, state information can be recorded and played only to the channel in which the event information was input. Or if it is not necessary, the recording and playing of the velocity of note-off or of the velocity of note-on can be simplified by omitting it.

In the first and second embodiment, all note-off process is executed on both of the recording and playing sides. However, in the sound generating device, not shown, which is connected to the performance information playing device 30, in case that the all note-off process is not executed, it is acceptable of not executing the all note-off process on either of the recording side or the playing side. Or the process on the playing side of all note-off process on the playing side can be changed partially. That is, the process which is similar to the note-on/off amendment process routine, executed prior to the B-note map update process in step X-5 of the channel mode decoding process, in other words, the all note-off amendment process which transfers the note-on information in which the velocity is set as "0" concerning the the note number in which the velocity is not "0" and the note-on flag is "1" in the B-note map can be performed.

Although the first and second embodiment, description was given of the process on the information of key-on/-off among the event information. It is needless to say that the same process can be applied to other event information. Also, as to the other event information, the afore-mentioned process can be executed.

For example, in the second embodiment, in case of using to the timing clock of the system real time message, arrange a A-timing clock counter ATCC in the A-RAM 22C of the performance information recording device 20 and a B-timing clock counter BTCC in the B-RAM 33C of the performance information playing device 30. And it is desirable to execute the following procedures.

In case that the MIDI message which is read out in the MIDI IN interruption process of the performance information recording device 20 is the START(FAH) or the CONTINUE(FBH) of the system real time message, clear the A-timing clock counter ATCC. In case of timing clock (F8H), the process of increasing the A-timing clock counter ATCC by "1" is added. Further, in case that the counting value of the A-timing clock counter ATCC indicates "127", return the A-timing clock counting value to "0" in the next increase.

Next, when the necessity arises, generate state information for the timing clock in which the first byte is set as "F4H" and the second byte is set as "78H" and the third byte is set as a counting value of the A-timing clock counter ATCC. And enter this state information to the Real Time transfer FIFO, and send a demand to record to the CD recording device 24. Further, the process of generating the state information for the timing clock is canceled if the process does not finish within the predetermined time (for example, 4 m Sec.) after receiving the timing clock. The reason for this cancellation is to prevent the occurrence of the MIDI IN interruption process based on a new timing clock while the process of generating the state information for the timing clock or the playing of a new timing clock while the state amendment process is under way in the performance information playing device 30 which is referred to later. Also, in case that the START (FAH) or the CONTINUE (FBH) are read out in the process of the MIDI IN interruption while the process of generating the state information for the timing clock is under way, the generating process is canceled.

On the other hand, in the performance information playing device 30, in case that the played data which is read out in the decoding interrupt process is the START (FAH) or the CONTINUE (FBH) of the system real time message clear the B-timing clock counter BTCC. In case of timing clock (F8H), the process of increasing the B-timing clock counter BTCC by "1" is added. Also, when the counting value of the B-timing clock counter BTCC indicates "127", return the B-timing clock counting value to "0" in the next increase. Further, change the state information decoding process when the necessity arises and replace the state timing clock counting value STCC with the third byte of the state information for the timing clock, in other words, the counting value of the A-timing clock counter ATCC.

In the state update process, a comparison is made between the state timing clock counting value STCC and the counting value of the B-timing clock counter BTCC. In case that it is decided to be the same, the process ends under the assumption that the timing clock is normally played. In case that the state timing clock counting value STCC is larger than the counting value of the B-timing clock counter BTCC, subtract the counting value of the B-timing clock counter BTCC from the state timing clock counter value STCC and replace a timing clock number for amendment CTCC with it. Next, enter the timing clock (F8H) of the same amount of the number of the timing clock number for amendment CTCC in the Real Time FIFO. Thus, the B-MIDI circuit 33D is enabled and the process ends. In case that the state timing clock counting value STCC is smaller than the counting value of the B-timing clock counter BTCC, subtract the counting value of the B-timing clock counter BTCC from the state timing clock counting value STCC and replace a timing clock number for amendment CTCC with it. And add "128" to this timing clock number for amendment CTCC. Next, enter the timing clock (F8H) which is equal to the amount of the number of the timing clock number for amendment CTCC in the Real Time FIFO. Thus, the B-MIDI circuit 33D is enabled and the process ends. Further, while the process is under way, in case that the START (FAH) or the CONTINUE (FBH) of the system real time message are read out in the decoding interruption process, the process is canceled.

In the recording and playing, in order to improve the reliability, it is acceptable to employ other error detecting technique or error correcting technique. Also, in order to simplify, it is acceptable not to use the check sum.

As to the other measures for corrections, following methods can be taken. For example, in order to cope with the missing of the key-off information, in the performance information recording device 20, at the time of the note-on processing, al note-off flag which corresponds to the MIDI channel of the note-on is cleared and at the time note-off processing, in case that the note-on flag is "1" and the velocity is "0" or the note-on flag is "0" concerning all the note No. of the MIDI channel of the note-off set the all note-off flag corresponding to the MIDI channel. If the all note-off flag is not cleared even after the predetermined time have passed since the all note-off flag is set, the all note-off flag may be cleared and an all note-off message or an all note-off process message in a form which is in accordance with the state information is recorded. On the playing side, execute the afore-mentioned all note-off amendment process.

Furthermore, time differences can be given between the note-off message and the all note-off message, taking the burst error into consideration.

Another method which may be employed, for example, is to record and play the MIDI message, which does not cause the malfunction even after receiving many times in the sound generating device, several times according to the necessities.

Concerning the MIDI message for which it is desirable to execute the processing in accordance with the predetermined timing such as the program change or timing clock of the system real time message, it is acceptable to record the forthcoming information which includes the MIDI message concerned, prior to the recording of the MIDI message for the predetermined time, in other words, delaying the time required to process all the MIDI messages and if necessary delaying the sound information and image information on the recording side. And on the playing side, it is also acceptable to execute the process based on the original information and in case that the original information is not read out even after the predetermined time has passed since the reading out of the forthcoming information, a process may be executed based on the MIDI message which is restored from the forthcoming information. Or the majority process may be executed. In this case, a reference can be made to the error information detected in the CD playing device 31.

In the first and the second embodiment, a description is given of the recording and playing to the sub code area of the CD, in case of recording large amount of the data such as the musical tone data corresponding to the performance data and/or the waveform data for a sampler, to the audio data area of the CD (in that case, it should be indicated in the sub code area), or in recording and playing the performance data and/or the musical tone data to the other recording media such as LD or VTR, the afore-mentioned procedure can be applied. Also, it can be applied for the transmission and receiving of MIDI data in the radio or the television. Further, it is needless to mention that the MIDI message can be applied, for example, to a mixer or a illuminating device or the recording and playing of the information similar to the MIDI message.

The performance information recording device 20 or the performance information playing device 30 can be integrated into the electric musical instrument. Also, a performance information recording/playing apparatus wherein a performance information recording device 20 and a performance information playing device 30 can be combined.

What is claimed is:

1. A performance information playing device comprising:
   playing means for reproducing event information which corresponds to changes in a state of a predetermined musical tone and state information which indicates a state at any given time of a musical tone of the predetermined musical tone after a change has occurred according to the event information, said event information and state information having been recorded in a recording media sequentially; and
   event information correcting means for correcting errors in the event information reproduced from the recording media by said playing means based on the state information reproduced in the same manner.

2. The performance information playing device as set forth in claim 1, wherein said event information correction means makes correction by amending the event information in accordance with a difference, said difference being generated by comparing contents of a memory map with the state information.

3. The performance information playing device as set forth in claim 1, wherein said event information includes note-off information and note-on information, and said state information includes a value representing a difference between a number of the note-ons a number of the note-offs for a predetermined musical tone.

4. The performance information playing device as set forth in claim 3, wherein said event information correcting means makes correction of the event information for the predetermined musical tone by amending the an event information in accordance with a difference said difference being generated by comparing contents of a memory map with the state information which includes said value.

5. A performance information playing device comprising:
   playing means for reproducing event information which represents a change in a state of a predetermined musical tone and an event information number which indicates a number of events up to a present, said event information number being determined by counting the events which have been recorded in a recording media sequentially; and
   event information correction means for correcting errors in the event information reproduced from the recording media by said playing means based on said event information number which is reproduced in a same manner.

6. The performance information playing device as set forth in claim 5 wherein said events which represent changes in the predetermined musical tone is a timing clock.

7. A performance information recording and playing apparatus
   event information means for generating event information, said event information representing a change in state of a musical tone;
   state information generating means for generating state information which indicates a state at any given time of a musical tone of a predetermined musical tone after a change has occurred in event information; and
   recording means for recording the event information and the state information generated by said state information generating means in a recording media sequentially;
   playing means for reproducing event information which corresponds to changes in a predetermined musical tone and state information which indicates a state of a musical tone of the predetermined musical tone after a change has occurred according to the event information, said event information and state information having been recorded in a recording media sequentially; and
   event information correcting means for correcting errors in the event information reproduced from the recording media by said playing means based on the state information reproduce in the same manner.

8. A performance information recording and playing apparatus comprising:
   event information means for generating event information, said event information representing a change in state of a musical tone;
   state information generating means for generating state information which indicates a state of a musical tone of a predetermined musical tone after a change has occurred in event information, said state information representing a state of a musical tone at any given time;

recording means for recording the event information and the state information generated by said state information generating means in a recording media sequentially;

playing means for reproducing event information which corresponds to changes in a state of a predetermined musical tone and state information which indicates a state at any given time of a musical tone of the predetermined musical tone after a change has occurred according to the event information, said event information and state information having been recorded in a recording media sequentially; and event information correcting means for correcting errors in the event information reproduced from the recording media by said playing means based on the state information reproduced in the same manner;

said event information including note-off information and note-on information;

said state information including a value representing a difference between a number of the note-ons a number of the note-offs for a predetermined musical tone.

9. A performance information recording and playing apparatus comprising:

event information means for generating event information, said event information representing a change in state of a musical tone;

event information number generating means for generating an event information number representing a number of events said number of events being determined by counting sequentially events which cause a change in a predetermined musical tone sequentially;

recording means for recording event information and said event information number in a recording media sequentially;

playing means for reproducing event information which represents a change in a state of a predetermined musical tone and an event information number which indicates a number of events up to a present, said event information number being determined by counting the events which have been recorded in a recording media sequentially; and event information correction means for correcting errors in the event information reproduced from the recording media by said playing means based on said event information number which is reproduced in a same manner.

10. A performance information playing device comprising:

playing means for reproducing event information which represents a change in a predetermined musical tone and all note-off information indicating that all notes for a predetermined MIDI channel are in a note-off state, said event information and all note-off information having been recorded in a recording media sequentially; and event information correction means for correcting errors in the event information reproduced from the recording media by said playing means based on said all note-off information reproduced in a same manner.

11. The performance information playing device as set forth in claim 18 wherein said event information correction means makes corrections by amending the event information in accordance with a difference, said difference being determined by comparing contents of a memory map with said all note-off information.

12. A performance information recording and playing apparatus all note-off information generating means for generating all note-off information indicating that all notes for a predetermined MIDI channel are in a note-off state; and all note-off information recording means for recording event information which represents a change in a predetermined musical tone and said all note-off information generated by said all note-off information generating means in a recording media sequentially, playing means for reproducing event information which represents a change in a predetermined musical tone and all note-off information indicating that all notes for a predetermined MIDI channel are in a note-off state, said event information and all note-off information having been recorded in a recording media sequentially; and event information correction means for correcting errors in the event information reproduced from the recording media by said playing means based on said all note-off information reproduced in a same manner.

* * * * *